United States Patent
Sutcher-Shepard et al.

(10) Patent No.: US 11,941,520 B2
(45) Date of Patent: Mar. 26, 2024

(54) HYPERPARAMETER DETERMINATION FOR A DIFFERENTIALLY PRIVATE FEDERATED LEARNING PROCESS

(71) Applicant: International Business Machines Corporation, Armonk, NY (US)

(72) Inventors: Colin Sutcher-Shepard, Troy, NY (US); Ashish Verma, Nanuet, NY (US); Jayaram Kallapalayam Radhakrishnan, Pleasantville, NY (US); Gegi Thomas, Danbury, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 906 days.

(21) Appl. No.: 16/738,114

(22) Filed: Jan. 9, 2020

(65) Prior Publication Data
US 2021/0216902 A1 Jul. 15, 2021

(51) Int. Cl.
*G06N 3/08* (2023.01)
(52) U.S. Cl.
CPC ..................... *G06N 3/08* (2013.01)
(58) Field of Classification Search
CPC ....................................................... G06N 3/08
See application file for complete search history.

(56) References Cited

U.S. PATENT DOCUMENTS

| | | | |
|---|---|---|---|
| 10,223,547 B2 | 3/2019 | Rane et al. | |
| 10,482,607 B1* | 11/2019 | Walters | G06F 40/166 |
| 10,657,461 B2* | 5/2020 | McMahan | G06F 17/18 |
| 2015/0235051 A1 | 8/2015 | Fawaz et al. | |
| 2015/0286827 A1* | 10/2015 | Fawaz | G06F 21/60 726/26 |
| 2018/0373988 A1* | 12/2018 | Dhanyamraju | G06F 16/986 |
| 2019/0147188 A1* | 5/2019 | Benaloh | G06F 21/602 726/26 |
| 2019/0227980 A1 | 7/2019 | McMahan et al. | |

(Continued)

FOREIGN PATENT DOCUMENTS

| | | | | |
|---|---|---|---|---|
| CN | 107368752 | | 11/2017 | |
| CN | 109034228 A | * | 12/2018 | ........... G06K 9/6256 |

OTHER PUBLICATIONS

Veen et al, "Three Tools for Practical Differential Privacy", arXiv:1812.02890v1 [stat.ML] Dec. 7, 2018 (Year: 2018).*

(Continued)

*Primary Examiner* — Casey R. Garner
(74) *Attorney, Agent, or Firm* — Amin, Turocy & Watson, LLP

(57) ABSTRACT

Techniques regarding determining hyperparameters for a differentially private federated learning process are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a hyperparameter advisor component that determines a hyperparameter for a model of a differentially private federated learning process based on a defined numeric relationship between a privacy budget, a learning rate schedule, and a batch size.

25 Claims, 12 Drawing Sheets

(56) References Cited

U.S. PATENT DOCUMENTS

| | | |
|---|---|---|
| 2019/0318121 A1 | 10/2019 | Hockenbrocht et al. |
| 2020/0202213 A1* | 6/2020 | Darvish Rouhani ........................ G06N 3/0454 |
| 2020/0249918 A1* | 8/2020 | Svyatkovskiy ........ G06N 3/084 |
| 2021/0064760 A1* | 3/2021 | Sharma ................... G06F 21/55 |
| 2021/0073677 A1* | 3/2021 | Peterson ................ G06N 20/00 |

OTHER PUBLICATIONS

Chen at al, "Renyi Differentially Private ERM for Smooth Objectives", National Science Foundation,2019 (Year: 2019).*

Smith el al, "Super-Convergence: Very Fast Training of Neural Networks Using Large Learning Rates", arXiv:1708.07120v3 [cs.LG] May 17, 2018 (Year: 2018).*

Papernot, "Machine Learning with Differential Privacy in TensorFlow", Mar. 26, 2019 (Year: 2019).*

Truex el al, "A Hybrid Approach to Privacy-Preserving Federated Learning", Session: Machine Learning for Security, 2019 (Year: 2019).*

Sun et al., "High Dimensional Restrictive Federated Model Selection with multi-objective Bayesian Optimization over shifted distributions," IEEE Intelligent Systems Conference, arXiv:1902.08999v2 [cs.LG], Aug. 8, 2019, 20 pages.

Abadi et al., "Deep Learning with Differential Privacy," arXiv:1607.00133v2 [stat.ML], Oct. 24, 2016, 14 pages.

Dwork et al., "The Algorithmic Foundations of Differential Privacy," Foundations and Trends in Theoretical Computer Science archive, vol. 9, Issue 3-4, Aug. 2014, 281 pages.

Goodfellow et al., "Qualitatively Characterizing Neural Network Optimization Problems," arXiv:1412.6544v6 [cs.NE], May 21, 2015, 21 pages.

McMahan et al., "A General Approach to Adding Differential Privacy to Iterative Training Procedures," arXiv:1812.06210v2 [cs.LG], Mar. 4, 2019, 8 pages.

"OpenMined/PySyft" hhttps://github.com/OpenMined/PySyft, Last Accessed Dec. 30, 2019. 5 pages.

Radebaugh, et al. "Introducing TensorFlow Privacy: Learning with Differential Privacy for Training Data." https://medium.com/tensorflow/introducing-tensorflow-privacy-learning-with-differential-privacy-for-training-data-b143c5e801b6. Last Accessed Dec. 30, 2019. 6 pages.

Mell, Peter, et al. "The NIST Definition of Cloud Computing." National Institute of Standards and Technology. Sep. 2011. 7 pages.

Argawal, et al. "cpSGD: communication-efficient and differentially-private distributed SGD." 32nd Conference on Neural Information Processing Systems (NIPS 2018), Montreal, Canada. 12 pages.

Bengio. "Practical recommendations for gradient-based training of deep architectures." arXiv:1206.5533v2 [cs.LG] Sep. 16, 2012. 33 pages.

Bonawitz, et al. "Towards Federated Learning at Scale: System Design." arXiv:1902.01046v2 [cs.LG] Mar. 22, 2019. 15 pages.

Bottou. "Online Learning and Stochastic Approximations." AT&T Labs—Research; 1998. 35 pages.

Ryffel, et al. "A generic framework for privacy preserving deep learning." arXiv:1811.04017v2 [cs.LG] Nov. 13, 2018. 5 pages.

Dwork, et al. "Differential Privacy." Automata, Languages and Programming: 33rd International Colloquium, ICALP 2006, Venice, Italy, Jul. 10-14, 2006, Proceedings, Part II. 12 pages.

Fredrikson, et al. "Model Inversion Attacks that Exploit Confidence Information and Basic Countermeasures." CCS'15, Oct. 12-16, 2015. 12 pages.

Gardiner. "Stochastic Methods: A Handbook for the Natural and Social Sciences." Springer Series in Synergetics, 2010. 224 pages.

Goodfellow, et al. "Deep Learning." MIT Press. 2015. 802 pages.

"Tensorflow." https://github.com/tensorflow/privacy, Last Accessed Dec. 27, 2019. 3 pages.

He, et al. "Deep Residual Learning for Image Recognition." arXiv:1512.03385v1 [cs.CV] Dec. 10, 2015. 12 pages.

Jastrzebski, et al. "Three Factors Influencing Minima in SGD." arXiv:1711.04623v3 [cs.LG] Sep. 13, 2018. 14 pages.

Kloeden, et al. "Numerical Solution of Stochastic Differential Equations." Springer-Verlag Berlin Heidelberg, 1992, 666 pages.

Krizhevy. "Learning Multiple Layers of Features from Tiny Images." University of Toronto, 2009. 60 pages.

Lecun, et al. "MNIST handwritten digit database." http://yann.lecun.com/exdb/mnist/, Last Accessed Dec. 30, 2019. 7 pages.

Lee, et al. "How Much Is Enough? Choosing & for Differential Privacy." ISC'11: Proceedings of the 14th international conference on Information security, Oct. 2011 pp. 325-340, 16 pages.

Li, et al. "Federated Learning: Challenges, Methods, and Future Directions." arXiv:1908.07873v1 [cs.LG] Aug. 21, 2019. 22 pages.

Li, et al. "t-Closeness: Privacy Beyond k-Anonymity and I-Diversity." 2007 IEEE 23rd International Conference on Data Engineering, DOI:10.1109/ICDE.2007.367856. 10 pages.

Machanavajjhala, et al. "L-diversity: Privacy beyond k-Anonymity." ACM Transactions on Knowledge Discovery from Data 1(1):1-52, Jan. 2007. 12 pages.

"PyTorch." https://pytorch.org/, Last Accessed Dec. 30, 2019. 3 pages.

McMahan, et al. "Communication-Efficient Learning of Deep Networks from Decentralized Data." arXiv:1602.05629v3 [cs.LG] Feb. 28, 2017. 11 pages.

Mironov. "Renyi Differential Privacy." arXiv:1702.07476v3 [cs.CR] Aug. 25, 2017. 13 pages.

Netzer, et al. "Reading Digits in Natural Images with Unsupervised Feature Learning." NIPS Workshop on Deep Learning and Unsupervised Feature Learning 2011. 9 pages.

Paszke, et al. "Automatic differentiation in PyTorch." 31st Conference on Neural Information Processing Systems (NIPS 2017). 4 pages.

Poggio, et al. "Theory of Deep Learning III: explaining the non-overfitting puzzle." arXiv:1801.00173v2 [cs.LG] Jan. 16, 2018. 36 pages.

Samarati, et al. "Protecting privacy when disclosing information: k-anonymity and its enforcement through generalization and suppression." Technical Report SRI-CSL-98-04. 1998.19 pages.

Shokri, et al. "Privacy-Preserving Deep Learning." CCS '15: Proceedings of the 22nd ACM SIGSAC Conference on Computer and Communications SecurityOct. 2015 pp. 1310-1321https://doi.org/10.1145/2810103.2813687. 12 pages.

Song, et al. "Stochastic gradient descent with differentially private updates."

Song, et al. "Learning from Data with Heterogeneous Noise using SGD." Proceedings of the 18th International Con-ference on Articial Intelligence and Statistics (AISTATS) 2015, San Diego, CA, USA. JMLR: W&CP vol. 38. 9 pages.

Thakkar, et al. "Differentially Private Learning with Adaptive Clipping." arXiv:1905.03871v1 [cs.LG] May 9, 2019. 9 pages.

Tramer, et al. "Stealing Machine Learning Models via Prediction APIs." arXiv:1609.02943v2 [cs.CR] Oct. 3, 2016. 19 pages.

Wu, et al. "Bolt-on Differential Privacy for Scalable Stochastic Gradient Descent-based Analytics." arXiv:1606.04722v3 [cs.LG] Mar. 23, 2017. 29 pages.

Zhu, et al. "The Anisotropic Noise in Stochastic Gradient Descent: Its Behavior of Escaping from Sharp Minima and Regularization Effects." rearXiv:1803.00195v5 [stat.ML] Jun. 10, 2019. 10 pages.

Yu, et al. "Stochastic Gradient Descent Algorithm Preserving Differential Privacy in Map Reduce Framework." Tongxin Xuebao/Journal on Communications 39, Jan. 25, 2018. 26 pages.

\* cited by examiner

RECEIVING, BY A SYSTEM OPERATIVELY COUPLED TO A PROCESSOR, HYPERPARAMETERS REGARDING A DIFFERENTIALLY PRIVATE FEDERATED LEARNING PROCESS, WHEREIN THE HYPERPARAMETERES ARE SELECTED FROM A GROUP CONSISTING OF A PRIVACY BUDGET, A LEARNING RATE, AND A BATCH SIZE — 802

DETERMINING, BY THE SYSTEM, A FIRST HYPERPARAMETER FOR A MODEL OF THE DIFFERENTIALLY PRIVATE FEDERATED LEARNING PROCESS, WHEREIN THE FIRST HYPERPARAMETER IS DETERMINED GIVEN A PLURALITY OF SECOND HYPERPARAMETERS, AND WHEREIN THE FIRST HYPERPARAMETER AND THE PLURALITY OF SECOND HYPERPARAMETERS ARE SELECTED FROM THE GROUP — 804

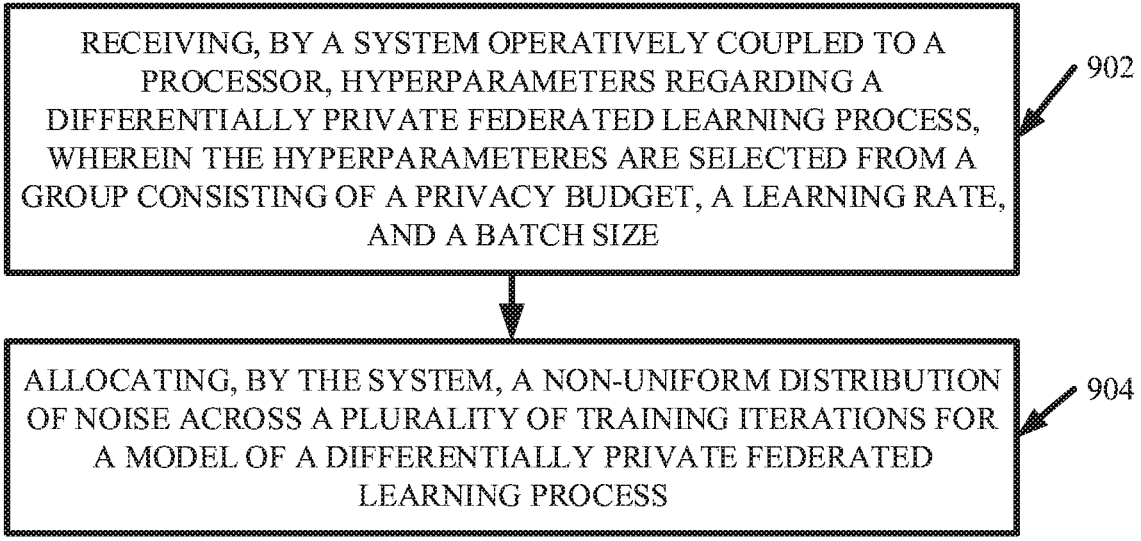

HYPERPARAMETER DETERMINATION FOR A DIFFERENTIALLY PRIVATE FEDERATED LEARNING PROCESS

BACKGROUND

The subject disclosure relates to determining one or more hyperparameters for a differentially private federated learning process, and more specifically, to utilizing an analytical relationship between a stochastic gradient descent ("SGD") loss function and a plurality of hyperparameters (e.g., a privacy budget parameter, a learning rate schedule, and/or a batch size) to improve accuracy of a training model while achieving a desired level of data privacy.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can utilize an analytical relationship between an SGD loss function and a plurality of hyperparameters to improve accuracy of a training model while achieving a desired level of data privacy are described.

According to an embodiment, a system is provided. The system can comprise a memory that can store computer executable components. The system can also comprise a processor, operably coupled to the memory, and that can execute the computer executable components stored in the memory. The computer executable components can comprise a hyperparameter advisor component that determines a hyperparameter for a model of a differentially private federated learning process based on a defined numeric relationship between a privacy budget, a learning rate schedule, and a batch size.

According to another embodiment, a system is provided. The system can comprise a memory that can store computer executable components. The system can also comprise a processor, operably coupled to the memory, and that can execute the computer executable components stored in the memory. The computer executable components can comprise a dynamic privacy component that can allocate a non-uniform distribution of noise across a plurality of training iterations for a model of a differentially private federated learning process.

According to an embodiment, a computer-implemented method is provided. The computer-implemented method can comprise determining, by a system operatively coupled to a processor, a first hyperparameter for a model of a differentially private federated learning process. The first hyperparameter can be determined given a plurality of second hyperparameters based on a defined relationship between the first hyperparameter and the plurality of second hyperparameters. Also, the first hyperparameter and the plurality of second hyperparameters can be selected from a group consisting of a privacy budget, a learning rate, and a batch size.

According to another embodiment, a computer-implemented method is provided. The computer-implemented method can comprise allocating, by a system operatively coupled to a processor, a non-uniform distribution of noise across a plurality of training iterations for a model of a differentially private federated learning process.

According to an embodiment, a computer program product for recommending hyperparameters for a differentially private federated learning process is provided. The computer program product can comprise a computer readable storage medium having program instructions embodied therewith. The program instructions can be executable by a processor to cause the processor to determine, by the processor, a hyperparameter for a model of the differentially private federated learning process based on a defined numeric relationship between a privacy budget, a learning rate schedule, and a batch size.

BRIEF DESCRIPTION OF THE DRAWINGS

FIG. 8 illustrates a flow diagram of an example, non-limiting method that can facilitate determining one or more hyperparameters for a machine learning model in a differentially federated learning process in accordance with one or more embodiments described herein.

FIG. 9 illustrates a flow diagram of an example, non-limiting method that can facilitate adding a non-uniform distribution of noise to a machine learning model in a federated learning process to achieve differential privacy in accordance with one or more embodiments described herein.

DETAILED DESCRIPTION

Figure 1:
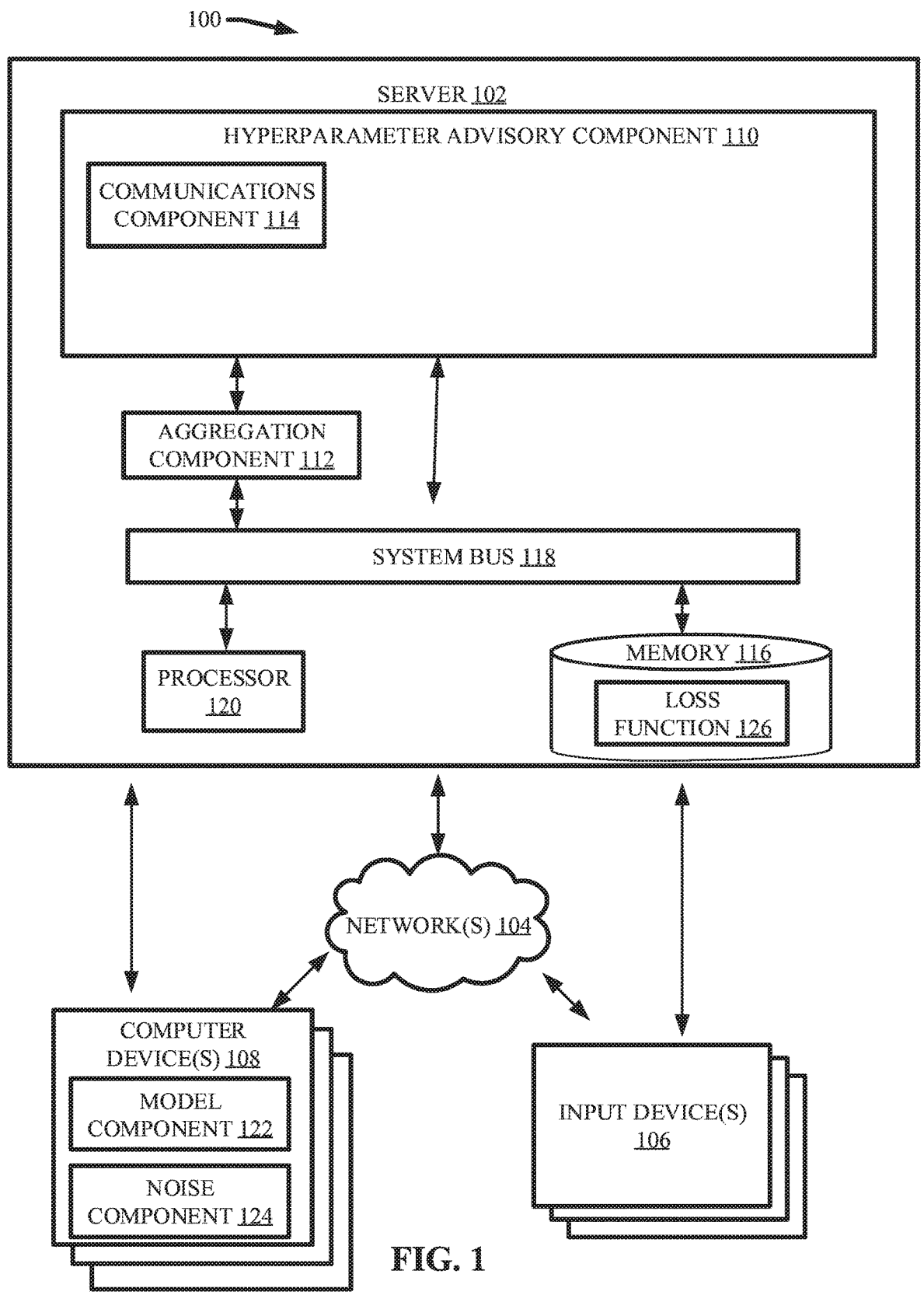
FIG. 1 illustrates a block diagram of an example, non-limiting system that can execute differentially private federated SGD learning process in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Federated learning has emerged as a promising paradigm to train models without having to share data that reside on multiple entities. The privacy of participants' data can be further enhanced by infusing differential privacy into the training process, by adding noise to gradients. However, the addition of noise introduces a tradeoff between the ensured level of privacy and an accuracy of the trained model.

Various embodiments of the present invention can be directed to computer processing systems, computer-implemented methods, apparatus and/or computer program products that facilitate the efficient, effective, and autonomous (e.g., without direct human guidance) determination of one or more hyperparameters for a differentially private federated learning process. For example, one or more embodiments described herein can regard a derived analytical relationship between a stochastic gradient descent ("SGD") loss function, a privacy budget parameter of the differential privacy environment, and hyperparameters of the model training performed in the federated learning environment (e.g., such as a learning rate schedule and/or batch size of training data points). Additionally, one or more embodiments can regard a non-uniform distribution of the privacy budget across the training iterations of the model such that the final accuracy of the model can be improved at a given set of hyperparameters.

The computer processing systems, computer-implemented methods, apparatus and/or computer program products employ hardware and/or software to solve problems that are highly technical in nature (e.g., differentially private federated learning processes), that are not abstract and cannot be performed as a set of mental acts by a human. Further, an attempted implementation of human operation to perform the described embodiments would contradict the inherent confidentiality achieved by the embodiments' autonomous nature. In addition, various embodiments described herein can extend the convergence analysis of conventional SGD processes to differentially private federated learning environments via a defined analytical relationship between the SGD loss function, model hyperparameters (e.g., learning rate schedule and/or batch size), and a noise budget parameter. Moreover, various embodiments described herein can regard a practical application of the analytical relationship to determine optimal hyperparameters that can improve and/or maximize the accuracy of a federated learning model while maintaining differential privacy. Also, various embodiments described herein can regard a practical application of the analytical relationship to dynamically adapt the amount of noise distributed to the models over the course of training by leveraging the privacy budget parameter's relationship with the learning rate schedule to minimize the total privacy loss of the federated learning process while increasing accuracy of the trained model.

As used herein, the terms "differential privacy," differential privacy processes," and/or "differentially private" can refer to one or more processes that can render an algorithm differentially private such that the inclusion of a single data instance from the training dataset causes only statistically insignificant changes to the algorithm's output. Differential privacy can place a theoretical limit on the influence of a single piece of data, thereby limiting a privacy adversary's ability to infer one or more characteristics of the data. For example, one or more differential privacy processes can add noise to an algorithm's output, wherein the added noise can be proportional to the sensitivity of the output and the sensitivity can measure the maximum change of the output due to the inclusion of a single data instance. Example differential privacy processes include the Laplacian and/or Gaussian mechanisms. Wherein multiple differential privacy processes are utilized to achieve differential privacy, the evaluation of a privacy guarantee can follow from the basic composition theorem or from advanced composition theorems and/or their extensions.

FIG. 1 illustrates a block diagram of an example, non-limiting system 100 that can autonomously determine one or more hyperparameters for one or more differentially federated learning processes. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, input devices 106, and/or computer devices 108. The server 102 can comprise hyperparameter advisory component 110 and/or aggregation component 112. The hyperparameter advisory component 110 can further comprise communications component 114. Also, the server 102 can comprise or otherwise be associated with at least one memory 116. The server 102 can further comprise a system bus 118 that can couple to various components such as, but not limited to, the hyperparameter advisory component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or computer devices 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the hyperparameter advisory component 110 can be provided on the one or more servers 102, it should be appreciated that the architecture of system 100 is not so limited. For example, the hyperparameter advisory component 110, or one or more components of hyperparameter advisory component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more hyperparameters into the system 100, thereby sharing (e.g., via a direct connection and/or via the one or more networks 104) said data with the server 102. For example, the one or more input devices 106 can send data to the communications component 114 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment. For example, the one or more input devices 106 can be employed to enter one or more privacy budget values for the whole training ("β"), privacy parameters ("∈"), a schedule of learning rates ("η"), and/or batch sizes ("S") into a federated learning environment that can comprise the server 102 and computer devices 108 operatively coupled via one or more direct electrical connections and/or the network 104.

Federated learning is a process for using machine learning algorithms to train models without necessitating the training data to be stored in a central location. For example, the system 100 can employ a federated learning process wherein the computer devices 108 train respective machine learning models based on confidential data sets stored on the computer devices 108. Further, the computer devices 108 can share one or more derivatives of the trained models, such as model weights or gradients with respect to the data points, with the aggregation component 112. The aggregation component 112 can aggregate the plurality of derivatives shared by a plurality of the computing devices 108 to derive an overall machine learning model. Thereby, the overall machine learning model can be trained on the data respectively stored on each of the computing devices 108 without storing or sharing the data with a central party.

In various embodiments, the computer devices 108 can comprise model component 122 and/or noise component 124. Also, the computer devices 108 can store one or more local datasets. The one or more model components 122 can execute one or more machine learning algorithms to generate and/or train one or more machine learning models based on the one or more confidential data sets. As used herein, the terms "machine learning algorithm" and/or "machine learning algorithms" can refer to one or more artificial intelligence algorithms that can automatically and/or autonomously learn and/or improve from an experience (e.g., training data) without explicit programming of the lesson learned and/or improved. For example, machine learning algorithms can facilitate supervised and/or unsupervised learning to perform tasks such as classification, regression, identification, recognition, and/or clustering.

Also, as used herein, the terms "machine learning model" and/or "machine learning models" can refer to one or more models that can comprise and/or present data collected by one or more machine learning algorithms, determinations made by one or machine learning algorithms, and/or lessons learned from one or more machine learning algorithms. In various embodiments, machine learning models can be predictive models generated based on the execution of one or more machine learning algorithms. Example types of machine learning models can include, but are not limited to: decision tree models, neural network (e.g., convolution neural network) models, a combination thereof, and/or the like. For example, the machine learning model, such as a neural network model, can be a computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Neural network models can learn through training, wherein data with known outcomes is inputted into the computer model, outputs regarding the data are compared to the known outcomes, and/or the weights of the computer model are autonomously adjusted based on the comparison to replicate the known outcomes. As used herein, the term "training data" can refer to data and/or data sets used to train one or more neural network models. As a neural network model trains (e.g., utilizes more training data), the computer model can become increasingly accurate; thus, trained neural network models can accurately analyze data with unknown outcomes, based on lessons learning from training data, to facilitate one or more machine learning tasks. Example neural network models can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), and/or neural turing machine ("NTM").

In one or more embodiments, the noise component 124 can add noise to the one or more machine learning models generated and/or by the model component 122 based on the privacy budget parameter. For example, the noise component 124 can add noise to the machine learning model derivatives prior to sharing the derivatives with the aggregation component 112 to train the overall machine learning model. An amount of privacy desired by the federated learning environment can be defined by the privacy budget parameter, wherein the amount of noise added by the noise component 124 to achieve the privacy level is based on the privacy budget parameter.

For example, a function can be $\epsilon$-differentially private if for all datasets X, X' that differ in a single data item and any possible output of the function t, in accordance with Equation 1 below.

$$\left| \ln \frac{P(f(X) = t)}{P(f(X') = t)} \right| \leq \epsilon \tag{1}$$

Wherein the privacy parameter $\epsilon$ can quantify the privacy risk such that a lower value for $\epsilon$ can equate to a higher level of data privacy. Further, the computer devices 108 can implement a variant of Equation 1, referred to as $(\epsilon, \delta)$-differential privacy, in accordance with Equation 2 below.

$$P(f(X)=t) \leq e^\epsilon P(f(X')=t) + \delta \tag{2}$$

Wherein differential privacy can be achieved by adding a noise term to the output of $f(\bullet)$ whose variance can be dependent on the parameters $\epsilon$ and $\delta$, wherein $\delta$ can be the confidence parameter (e.g., a function can be $(\epsilon, \delta)$-differentially private if $\epsilon$-differential privacy holds with probability $1-\delta$). Further, an additive Gaussian noise term with 0 mean and a standard deviation in accordance with Equation 3 can ensure $(\epsilon, \delta)$-differential privacy where $\Delta f$ can be the sensitivity of $f(\bullet)$. The sensitivity can be a measure of how much the computation can change when a single element of the underlying dataset changes, wherein the change can be measured using a norm of type 1 (e.g., 1 can be chosen as 1 or 2). For instance, the sensitivity can be characterized by Equation 4 below.

$$\sigma = \Delta f \cdot \frac{2\ln \frac{1.25}{\delta}}{\epsilon} \tag{3}$$

$$\delta f = \sup_{(X,X')} (\| f(X) - f(X') \|_l) \tag{4}$$

Additionally, training the one or more models can comprise a plurality of aggregation queries (e.g., performed over multiple training iterations). For example, each time raw model parameters are shared outside the computing device 108 where the learning occurs (e.g., with the aggregation component 112) there can be privacy loss. This sharing can happen at each iteration, or can happen after a plurality of iterations. Thus, the total privacy loss over the course of training can be considered with regards to a privacy budget $\beta$, which can equal the sum of all the privacy parameters $\epsilon$ used across the training iterations. For example, wherein a machine learning model is trained by the computer devices 108 (e.g., via the model component 122) for T iterations, a total privacy budget $\beta$, presuming a constant value of $\epsilon_0$ at each iteration (e.g., a uniform distribution of noise across the training iterations) and that parameters can be aggregated every iteration, can be characterized by Equation 5 below.

$$\beta = \sum_{i=1}^{T} \epsilon_0 = T\epsilon_0 \tag{5}$$

Various embodiments can also use different formulations of privacy budgets based on one or more advanced composition theorems, wherein the total privacy loss can be lower than the above formulation. Further, one or more embodiments described herein can regard a non-uniform distribution of noise in which the privacy budget can be characterized by a privacy parameters that can vary across the training iterations (e.g., as described later herein).

Furthermore, in various embodiments, the computer devices 108 can utlize one or more variants of SGD techniques to train and/or privatize the machine learning models. For example, in a distributed SGD technique, a mini-batch of data samples can be distributed over multiple computer devices 108 who can compute gradients of the model on their local share of the mini-batch. In one or more embodiments, the system 100 can incorporate one or more variants of SGD techniques into the federated learning environment to achieve differential privacy. For example, $f(\bullet)$ can correspond to computing the gradient of the model parameters on the local dataset. The update rule for mini-batch SGD with a batch size S and a learning rate $\eta$ can be characterized by Equation 6 below.

$$\theta_{k+1} = \theta_k - \eta \frac{1}{S} \sum_{i=1}^{S} g(x_i) \tag{6}$$

Wherein $g(x_i)$ can correspond to the gradient of the loss function evaluated on data point $x_i \in X$.

Also, the quantity that can be shared during the gradient exchange can be characterized by Equation 7 below, wherein the sensitivity can depend upon the gradient of one data point that is different in the two datasets X and X' in accordance with Equations 8-11 below.

$$f(x) = \eta \frac{1}{S} \sum_{i=1}^{S} g(x_i) \tag{7}$$

-continued $$\delta f = \| f(X) - f(X') \|_l \quad (8)$$

$$= \frac{\eta}{S} \| \sum_{i=1}^{S} (g(x_i) - g(x'_i)) \|_l \quad (9)$$

$$= \frac{\eta}{S} \| g(x_j) - g(x'_j) \|_l \quad (10)$$

$$\leq \frac{\eta}{S} \cdot 2C \quad (11)$$

Wherein the constant C can be an upper bound on the gradient. Thereby, the standard deviation of the Gaussian noise term to be added to the gradients to make them $(\epsilon, \delta)$-differential privacy can be characterized as $$2C \frac{\eta}{S} \frac{\ln \frac{1.25}{\delta}}{\epsilon}.$$

For instance, an algorithm for differentially private SGD can be described by Algorithm 1 below.

---
Algorithm 1 ($\epsilon$, $\delta$)-differentially private SGD
---

Inputs: learning rate: $\eta$, batch size: S, clipping length: C, privacy budget: $T\epsilon_0$, initial weights: $\theta_0$
    for t = 0, 1, 2, 3, . . . , T do
        Sample S data points uniformly at random
        compute $f(X) = \sum_{i=1}^{S} g(x_i)$
        clip gradient: $f(X) \leftarrow f(X)/\max\left(1, \frac{\|f(X)\|}{C}\right)$
        sample $Z_k$ from the distribution $N\left(0, 2C\frac{\eta}{S}\frac{\ln\frac{1.25}{\delta}}{\epsilon}\right)$
        $\theta_{t+1} \leftarrow \theta_t - \eta f(X) + Z_k$
    end for With regards to the convergence of the SGD differentially private process, given a dataset $X = \{x_1, x_2, \ldots, x_N\}$ of size N, a machine learning model with weights $\theta$ and a loss function $L(\theta, X)$, let the gradient of the empirical loss function with regards to the weights at training iteration k be characterized by Equation 12 below.

$$g(\theta_k) = \nabla_\theta L(\theta_k, X) = \frac{1}{N} \sum_{i=1}^{N} \nabla_\theta l(\theta_k, x_i) \quad (12)$$

Further, Equation 13 below can characterize the gradient of the loss function with respect to the model weights evaluated on a single data point for index $n \in \{1, 2, \ldots, N\}$ chosen uniformly at random.

$$g_n(\theta_k) = \nabla_\theta l(\theta_k, x_n) \quad (13)$$

If S data points are sampled to form a mini-batch B and the gradient can be evaluated on B, Equation 14 can be defined.

$$g^S(\theta_k) = \frac{1}{S} \sum_{n \in B} g_n(\theta_k) \quad (14)$$

With a large enough batch size, the mini-batch gradient can be a sample mean of the individual gradient approximations. Under the Central Limit Theorem, the mini-batch gradient update can be a Gaussian random variable with mean equal to the full gradient evaluated on all the data points. Wherein the covariance matrix of gradients is $\text{Cov}(g_i(\theta_k)) = \Sigma(\theta_k)$, then the covariance matrix of the random variable in Equation 15 below can be $$\frac{1}{S} \Sigma(\theta).$$

Also, the update rule for mini-batch SGD with batch size S and learning rate $\eta$ can be written in terms of the full gradient $g(\theta)$, as shown in Equation 15.

$$\theta_{k+1} = \theta_k - \eta g(\theta_k) + \eta(g(\theta_k) - g^S(\theta_k)) \quad (15)$$

Considering the incorporation of differential privacy (e.g., in accordance with Algorithm 1), the update in Equation 15 with the addition of Gaussian noise can be defined in Equation 16 below.

$$\theta_{k+1} = \theta_k - \eta g(\theta_k) + \eta g(\theta_k) - g^S(\theta_k) + Z_k \quad (16)$$

Wherein $Z_k$ can be sampled from a zero mean Gaussian distribution with covariance matrix $$\left(\frac{2C\ln\frac{1.25}{\delta}}{S\epsilon}\right)^2 I.$$

For clarity, $$\gamma = 2C\ln\frac{1.25}{\delta}$$

such that the covariance matrix can be represented by $\gamma/S\epsilon I$. Further, the summation within the parenthesis of the last term in Equation 16 can be the sum of two independent, zero mean Gaussian random variables and thereby can be a Gaussian random variable with zero mean and covariance matrix of $$\frac{1}{S} \Sigma(\theta) + \left(\frac{\gamma}{S\epsilon}\right)^2 I.$$

Further, wherein $R(\theta)$ can be a matrix such that $$R(\theta) R^T(\theta) = \Sigma(\theta) + \frac{\gamma^2}{S\epsilon^2} I,$$

and Equation 16 can be rewritten as Equation 17 below.

$$\theta_{k+1} = \theta_k - \eta g(\theta_k) + \sqrt{\frac{\eta}{S}} R(\theta) \Delta W_k \quad (17)$$

Wherein $\Delta W_k$ can be a zero mean Gaussian random variable with covariance matrix $\eta I$.

Further, Equation 17 can be the Euler-Maruyama discretization of the following stochastic differential equation ("SDE"), Equation 18.

$$d\theta = -g(\theta) dt + \sqrt{\frac{\eta}{S}} R(\theta) dW(t) \quad (18)$$

The learning rate and the batch size can appear as the ratio $$\frac{\eta}{S}.$$

Further, the variance of the differentially private SGD algorithm can be dependent on four factors: learning rate η, batch size S, a privacy parameter ∈ (e.g., characterizing privacy loss), and/or the covariance matrix due to using SGD (Σ(θ)). Additionally, the factors can be related by the expression $$\frac{\eta}{S}R(\theta)R^T(\theta) = \frac{\eta}{S}\sum(\theta) + \frac{\eta}{S^2}\frac{\gamma^2}{\epsilon^2}I.$$

In various embodiments, the SGD differentially private federated learning process can incorporate two assumptions. The first assumption can be that after sufficient iterations, the solution can be sufficiently close to a local minima that the loss function can be approximated as a quadratic bowl around that minima. For example, at least due to the over-parameterized nature of DNNs, the minimum loss can be expected to be zero. The second assumption can be that the covariance matrix of the SGD gradients and the Hessian of the loss function at the local minima to which the loss converges can be sufficiently similar, such that Σ(θ)=H. Thereby, H can be a symmetric positive definite ("SPD") and can be represented using the eigen-decomposition H=Σ(θ)=UΛU$^T$. Wherein "Λ" can be the diagonal matrix of positive eigenvalues and "U" can the associated matrix of orthonormal eigen-vectors. Close to a local minima θ* the loss function can be approximated using the Hessian as $\mathcal{L}(\theta)=(\theta-\theta^*)^T H(\theta-\theta^*)$.

Considering the covariance matrix of Equation 18, $$M = \sum + \frac{\gamma^2}{S\epsilon^2}I.$$

Further, since $$\sum = H, M = H + \frac{\gamma^2}{S\epsilon^2}I.$$

Also, since H can be a SPD and $$\frac{\gamma^2}{S\epsilon^2}I$$

can be a SPD, and each of S>0, γ>0, ∈>0, so their sum M can also be SPD. At least due to a scalar multiple of the identity matrix to H, the eigenvalues of the sum can be sums of the eigenvalues of the original matrices. Thereby, if λ∈ Spec (H), then $$\lambda + \frac{\gamma^2}{S\epsilon^2} \in Spec(M)$$

with the same associated eigenvector. Thus, the eigen-decomposition of M can be $$M = U\left(\Lambda + \frac{\gamma^2}{S\epsilon^2}I\right)U^T.$$

Wherein the change of variables is q(θ)=U$^T$(θ−θ*) the approximation to the loss function can be characterized by Equations 19-21 below.

$$\mathcal{L}(\theta) = (\theta-\theta^*)^T H(\theta-\theta^*) \qquad (19)$$

$$= (\theta-\theta^*)^T(U\Lambda U^T)(\theta-\theta^*) \qquad (20)$$

$$= q(\theta)^T \Lambda q(\theta) \qquad (21)$$

The gradient of the loss function can be characterized by Equation 22 below.

$$g(\theta)=\Lambda q(\theta) \qquad (22)$$

With the change of variables the SDE Equation 18 can be characterized by Equation 23 below.

$$dq(\theta) = -\Lambda q(\theta)dt + \sqrt{\frac{\eta}{S}}\left(\Lambda + \frac{\gamma^2}{S\epsilon^2}I\right)^{\frac{1}{2}}dW(t) \qquad (23)$$

Considering the total training as a finite interval of time t∈ [0, T], the interval can be divided into K even increments of length Δt=T/K, wherein "7" can correspond to the number of training iterations. Further, discretizing Equation 23 with the E-M scheme can define Equation 24 below.

$$q(\theta_{k+1}) = q(\theta_k) - \Lambda q(\theta_k)\Delta t + \sqrt{\frac{\eta}{s}}\left(\Lambda + \frac{\gamma^2}{S\epsilon^2}I\right)^{1/2}\Delta W_k \qquad (24)$$

Wherein ΔW$_k$ can be the increment of the Weiner Process, a Gaussian random variable with mean 0 and variance Δt. To recover the update of Equation 16, η=Δt.

Since the linear drift term −Λ can be constant with respect to q(θ) and there can be a constant matrix multiplied by dW, this can be an Omstein-Uhlenbeck ("OU") process that can converge to a stationary zero mean Gaussian distribution with covariance matrix, as characterized by Equations 25-27 below.

$$\mathbb{E}[q(\theta)q^T(\theta)] = \frac{\left(\sqrt{\frac{\eta}{S}}\left(\Lambda + \frac{\gamma^2}{S\epsilon^2}I\right)^{\frac{1}{2}}\right)^2}{2\Lambda} \qquad (25)$$

$$= \frac{\eta}{2S}\frac{\Lambda + \frac{\gamma^2}{S\epsilon^2}I}{\Lambda} \qquad (26)$$

$$= \frac{\eta}{2s}\left(I + \frac{\gamma^2}{S\epsilon^2}\Lambda^{-1}\right) \qquad (27)$$

Let the dimensionality of the gradient be D, that is $q(\theta) \in \mathbb{R}^D$. The expected loss can be characterized by Equations 28-32 below.

$$\mathbb{E}[L(q(\theta))] = \mathbb{E}[q^T(\theta) \Lambda q(\theta)] \quad (28)$$

$$= \sum_{i=1}^{D} \lambda_i \mathbb{E}[q_i(\theta)^2] \quad (29)$$

$$= \frac{\eta}{2S} \sum_{i=1}^{D} \lambda_i \left(1 + \frac{\gamma^2}{S\epsilon^2 \lambda_i}\right) \quad (30)$$

$$= \frac{\eta}{2S} \sum_{i=1}^{D} \lambda_i + \frac{\eta \gamma^2}{2S^2 \epsilon^2} \sum_{i=1}^{D} 1 \quad (31)$$

$$= \frac{\eta}{2S} Tr(H) + \frac{\eta D \gamma^2}{2S^2 \epsilon^2} \quad (32)$$

Thus, the learning rate, batch size, and privacy parameter can be related by the ratio $$\frac{\eta}{S^2 \epsilon^2},$$

wherein "Tr(H)" can correspond to the trace of matrix H.

Equation 32 can characterize an SGD loss function 126 that can define an analytical relationship between the accuracy of the model, the learning rate schedule, the batch size, and the privacy parameter budget. Lower loss can imply higher model accuracy and vice-versa. The loss function 126 can be stored in the one or more memories 116 of the system 100. For example, the loss function 126 can be stored in one or more memories 116 of the server (e.g., as shown in FIG. 1) and/or the computer devices 108.

In various embodiments, the hyperparameter advisory component 110 can utilize the loss function 126 to determine one or more parameters regarding the federated learning process given one or more other parameters entered into the system 100 (e.g., via the one or more input devices 106 and/or networks 104). For example, the hyperparameter advisory component 110 can determine, based on the loss function 126, one or more learning rate schedules and/or batch sizes to be utilized by the model component 122 in generating and/or training the machine learning models. In another example, the hyperparameter advisory component 110 can determine, based on the loss function 126, a privacy budget to delineate how much noise is be added by the noise component 124 in achieving differential privacy.

In various embodiments, the hyperparameter advisory component 110 can utilize the above relationship between batch size, learning rate, and the privacy parameter to determine one or more hyperparameter correlations. For example, the privacy parameter can be reduced by a factor of k by increasing the batch size by the same factor k without compromising the accuracy of the model while achieving higher privacy guarantees. In another example, the privacy parameter can be reduced by a factor k by decreasing the learning rate by the same factor k without compromising the accuracy of the model while achieving higher privacy guarantees.

Figure 2:
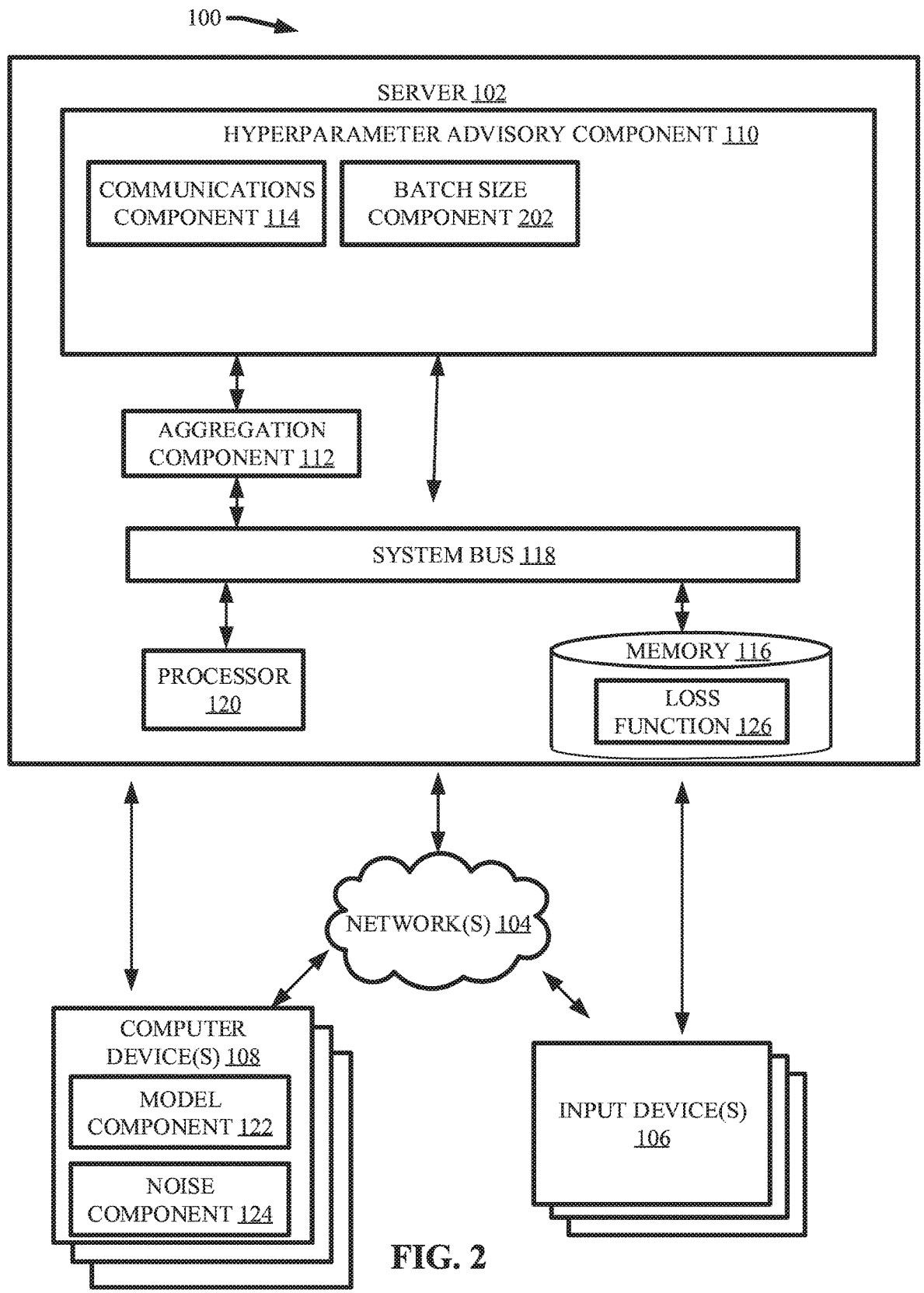
FIG. 2 illustrates a block diagram of an example, non-limiting system that can determine one or more batch size computations for training a machine learning model given a learning rate schedule and privacy budget in accordance with one or more embodiments described herein.

FIG. 2 illustrates a diagram of the example, non-limiting system 100 further comprising batch size component 202 in accordance with one or more embodiments described herein. Repetitive description of like elements employed in other embodiments described herein is omitted for sake of brevity. In various embodiments, the batch size component 202 can determine one or more batch size computations given one or more privacy parameters and/or learning rates. For example, the one or more batch size computations can include, but are not limited to, the batch size value S and/or a factor by which the batch size can be changed based on a change in the learning rate schedule and/or privacy budget. Further, the batch size component 202 can determine the one or more batch size computations that maximize accuracy of the one or more machine learning models.

In one or more embodiments, the one or more input devices 106 can be employed to define one or more learning rate schedules, learning rate constraints, and/or privacy budgets. The one or more learning rate schedules can delineate one or more learning rates that can be employed by the one or more model components 122 across the training iterations during training the machine learning models. The one or more privacy budgets can delineate the total amount of noise that can be employed by the one or more noise components 124 via the privacy parameters to perform a differentially privacy process on the trained machine learning models. The one or more learning rate constraints can delineate a maximum learning rate that can be employed by the model component 122. In various embodiments, the one or more learning rate constraints can be based on one or more hardware capacities of the computing devices 108 (e.g., properties of one or more graphics processing units ("GPUs") of the computing devices 108). Given the learning rates and/or privacy parameters, the batch size component 202 can utilize the loss function 126 to determine the batch size. For instance, loss function 126 can define a numerical relationship between the batch size, learning rate schedule, and privacy budget as described herein, wherein the one or more batch size computations can be determine based on the given inputs and the numerical relationship.

In various embodiments, the loss function 126 can be minimized to maximize accuracy of the training machine learning models; thereby, the batch size component 202 can determine the batch size that maximizes the accuracy of the training machine learning models given the learning rates (e.g., as delineated by the learning schedule) and privacy parameters (e.g., as delineated by the privacy budget) based on the loss function 126. For instance, in one or more embodiments, for each learning rate, the batch size component 202 can select a batch size that minimizes $$\frac{\eta}{S^2 \epsilon^2},$$

which can then be stored (e.g., in the one or more memories 116) in the T value. Then the batch size component 202 can decrease E and/or S such that the $$\frac{\eta}{S^2 \epsilon^2}$$

is equal to or less than the T value. Thereby, the batch size component 202 can determine the batch size that maximizes accuracy of the machine learning models and minimizes the amount of added noise.

In one or more embodiments, the batch size component 202 can use the entered learning rate schedule to determine the learning rate for each iteration of the training process. Further, the batch size component 202 can determine a batch size schedule that is the opposite of the learning rate schedule (e.g., in accordance with the defined relationships established by the loss function 126). For instance, if the learning rate decreases by a factor of K after N training iterations, the batch size component 202 can utilize a batch size that increases by the factor of K after every N training iterations. Also, the batch size component 202 can direct the noise components 124 to distribute the privacy budget in a privacy distribution scheme that mirrors the same ratio as that of the learning rate across the training iterations. For instance, if the learning rate decreases by a factor of K after every N training iterations, the noise components 124 can distribute the privacy budget such that the privacy parameters decreases by the factor K at every N training iterations. Next, the batch size component 202 can direct the model components 122 to replace the original learning rate schedule with a constant learning rate across the training iterations. The noise components 124 can utilize the privacy distribution scheme to determine the amount of noise to be added to gradients; for example, entailing generating a Gaussian random variable with zero mean and standard deviation proportional to the privacy budget parameter. Then the noise component 124 can add the determined noise to the gradient and share the trained machine learning models with the aggregation component 112.

Figure 3:
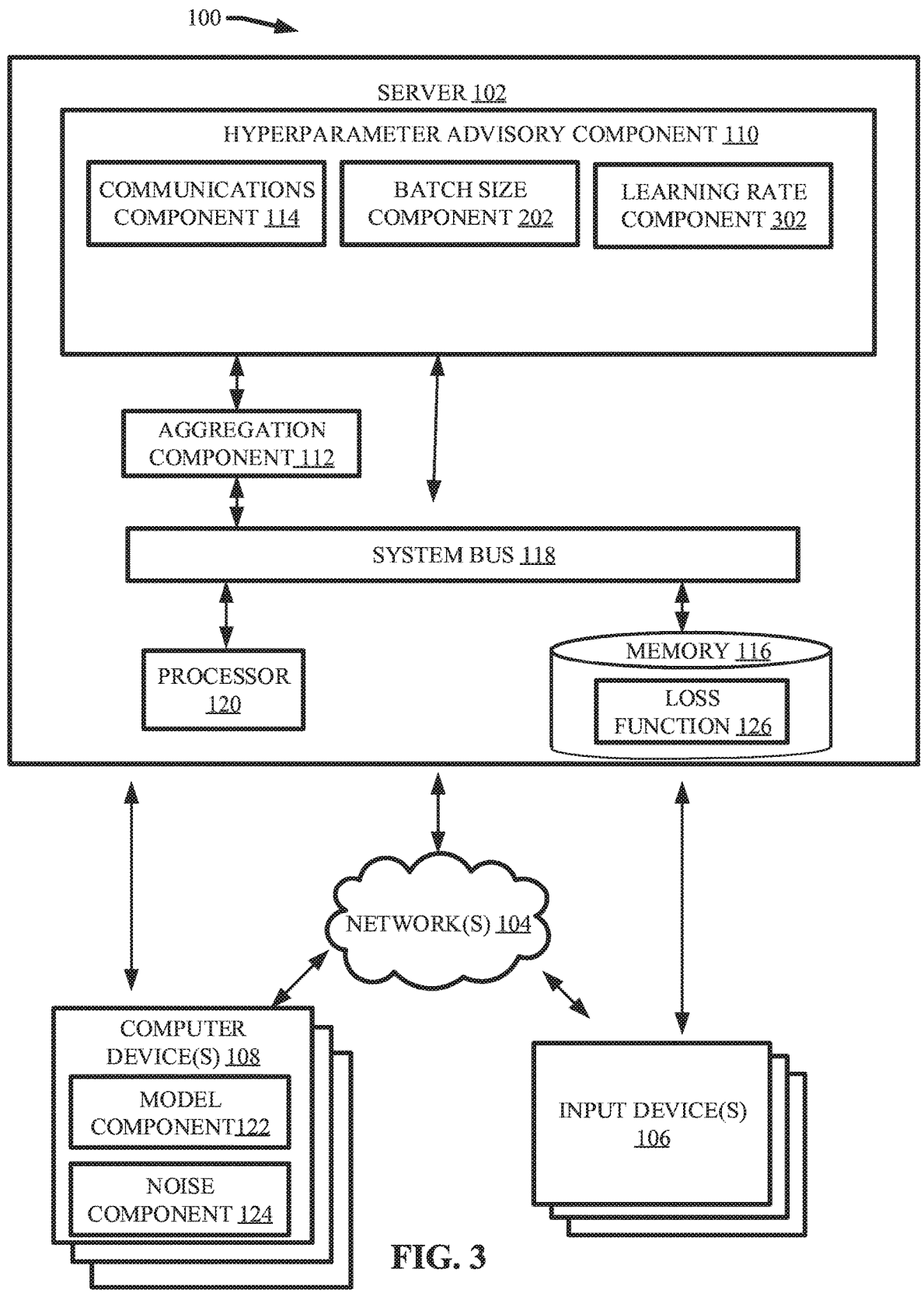
FIG. 3 illustrates a block diagram of an example, non-limiting system that can determine one or more learning rate computations for training a machine learning model given a batch size and privacy budget in accordance with one or more embodiments described herein.

FIG. 3 illustrates a diagram of the example, non-limiting system 100 further comprising learning rate component 302 in accordance with one or more embodiments described herein. Repetitive description of like elements employed in other embodiments described herein is omitted for sake of brevity. In various embodiments, the learning rate component 302 can determine one or more learning rate computations given one or more privacy parameters and/or batch sizes. For example, the one or more learning rate computations can include, but are not limited to, the learning rate schedule (e.g., comprising one or more learning rates) and/or a factor by which the one or more learning rates can be changed based on a change in the batch size schedule and/or privacy budget. Further, the learning rate component 302 can determine the one or more batch size computations that maximize accuracy of the one or more machine learning models.

In one or more embodiments, the one or more input devices 106 can be employed to define one or more batch size, privacy budgets, batch size constraints, and/or learning rate constraints. The one or more batch sizes can delineate how many data points can be sampled by the one or more model components 122 in a training iteration during training the machine learning models. In various embodiments, the one or more given batch sizes can define a permissible batch size range that can be utilized during the training process. The one or more privacy budgets can delineate the total amount of noise that can be employed by the one or more noise components 124 via the privacy parameters to perform a differentially privacy process on the trained machine learning models. The one or more learning rate constraints can delineate a maximum learning rate that can be employed by the model component 122. In various embodiments, one or more batch size constraints can be based on one or more hardware capacities of the computing devices 108 (e.g., properties of one or more graphics processing units ("GPUs") of the computing devices 108). Given the batch sizes and/or privacy parameters, the learning rate component 302 can utilize the loss function 126 to determine the learning rate schedule. For instance, loss function 126 can define a numerical relationship between the batch size, learning rate schedule, and privacy budget as described herein, wherein the one or more learning rate computations can be determine based on the given inputs and the numerical relationship.

In various embodiments, the loss function 126 can be minimized to maximize accuracy of the training machine learning models; thereby, the learning rate component 302 can determine the one or more learning rates that maximize the accuracy of the training machine learning models given the batch size and privacy parameters (e.g., as delineated by the privacy budget) based on the loss function 126. For instance, in one or more embodiments, for each batch size, the learning rate component 302 can select a learning rate that minimizes $$\frac{\eta}{S^2\epsilon^2},$$

which can then be stored (e.g., in the one or more memories 116) in the T value. Then the batch size component 202 can decrease $\epsilon$ and/or S such that the $$\frac{\eta}{S^2\epsilon^2}$$

is equal to or less than the T value. Thereby, the learning rate component 302 can determine the learning rate schedule that maximizes accuracy of the machine learning models and minimizes the amount of added noise.

Figure 4:
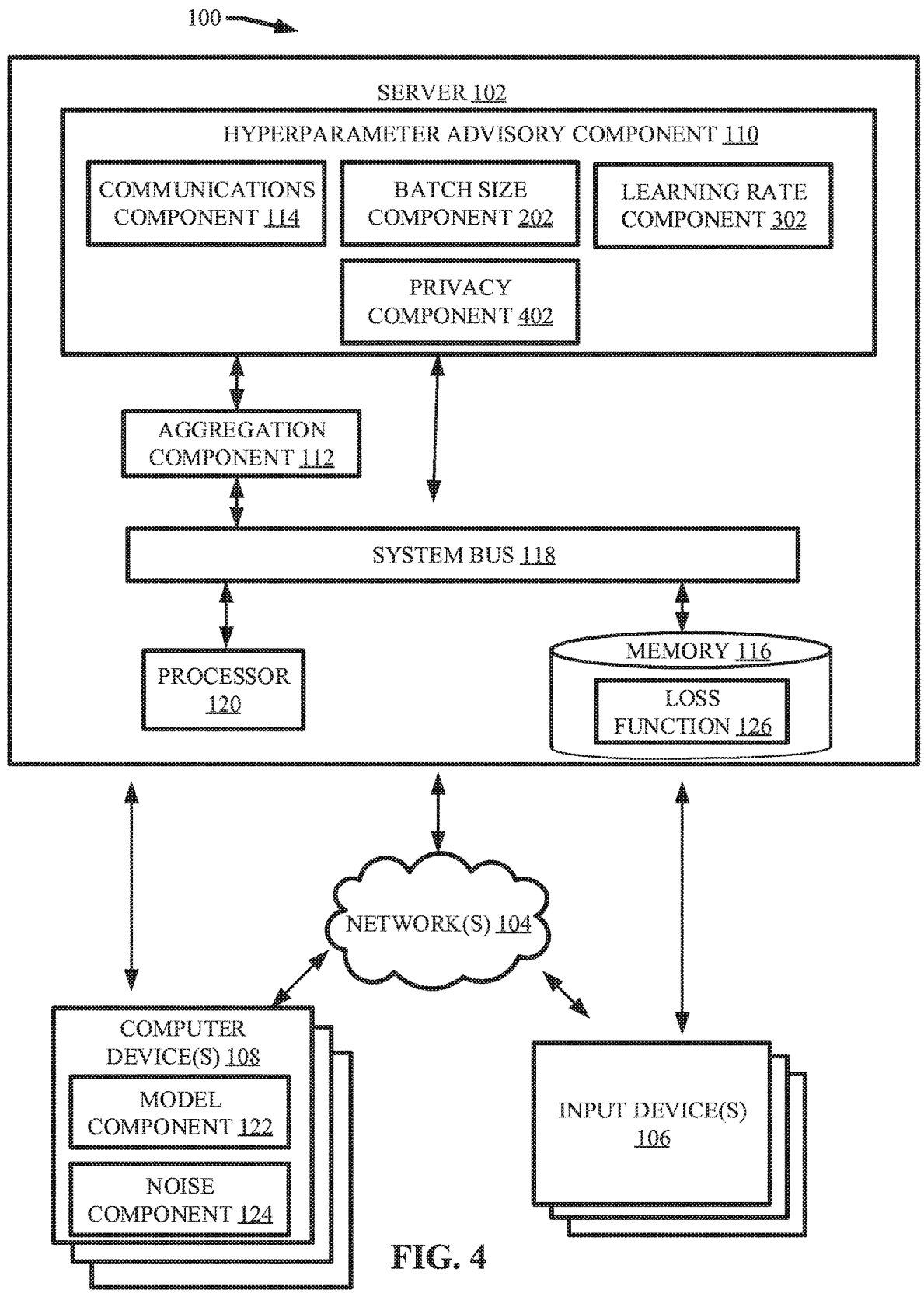
FIG. 4 illustrates a block diagram of an example, non-limiting system that can determine one or more privacy computations for achieving differential privacy given a learning rate schedule and batch size in accordance with one or more embodiments described herein.

FIG. 4 illustrates a diagram of the example, non-limiting system 100 further comprising privacy component 402 in accordance with one or more embodiments described herein. Repetitive description of like elements employed in other embodiments described herein is omitted for sake of brevity. In various embodiments, the privacy component 402 can determine one or more privacy computations given one or more learning rates and/or batch size s. For example, the one or more privacy computations can include, but are not limited to, the one or more privacy parameters and/or a factor by which the one or more privacy parameters can be changed based on a change in the batch size and/or learning rate schedule. Further, the privacy component 402 can determine the one or more privacy computations that maximize accuracy of the one or more machine learning models.

In one or more embodiments, the one or more input devices 106 can be employed to define one or more batch sizes, learning rate schedules, learning rate constraints, batch size constraints, number of training iterations, and/or privacy budgets. The one or more batch sizes can delineate how many data points can be sampled by the one or more model components 122 across the training iterations during training the machine learning models. In various embodiments, the one or more given batch sizes can define a permissible batch size range that can be utilized during the training process. The one or more privacy budgets can delineate the total amount of noise that can be employed by the one or more noise components 124 via the privacy parameters to perform a differentially privacy process on the trained machine learning models. The one or more batch size constraints can delineate a maximum learning rate that can be employed by the model component 122. In various embodiments, the one or more learning rate constraints can be based on one or more hardware capacities of the computing devices 108 (e.g., properties of one or more graphics processing units ("GPUs") of the computing devices 108).

The one or more learning rate schedules can delineate one or more learning rates that can be employed by the one or more model components 122 across the training iterations during training the machine learning models. Given the batch sizes, learning rate schedule, and/or privacy budget, the privacy component 402 can utilize the loss function 126 to determine the one or more privacy parameters. For instance, loss function 126 can define a numerical relationship between the batch size, learning rate schedule, and privacy parameters as described herein, wherein the one or more privacy computations can be determine based on the given inputs and the numerical relationship.

In various embodiments, the loss function 126 can be minimized to maximize accuracy of the training machine learning models; thereby, the privacy component 402 can determine the privacy parameter to be used at each training iteration that maximizes the accuracy of the training machine learning models given the batch size and learning rates (e.g., as delineated by the learning rate schedule) based on the loss function 126. For instance, in one or more embodiments, for each learning rate and batch size combination, the privacy component 402 can select a privacy parameter that is greater than or equal to the learning rate, wherein the privacy component 402 can select a largest batch size of the permissible batch sizes defined by the batch size range. For example, as the batch size increases more noise can be added without diminishing the accuracy of the machine learning models. Thereby, the privacy component 402 can determine the one or more privacy parameters that maximize accuracy of the machine learning models and minimize the amount of added noise.

Figure 5:
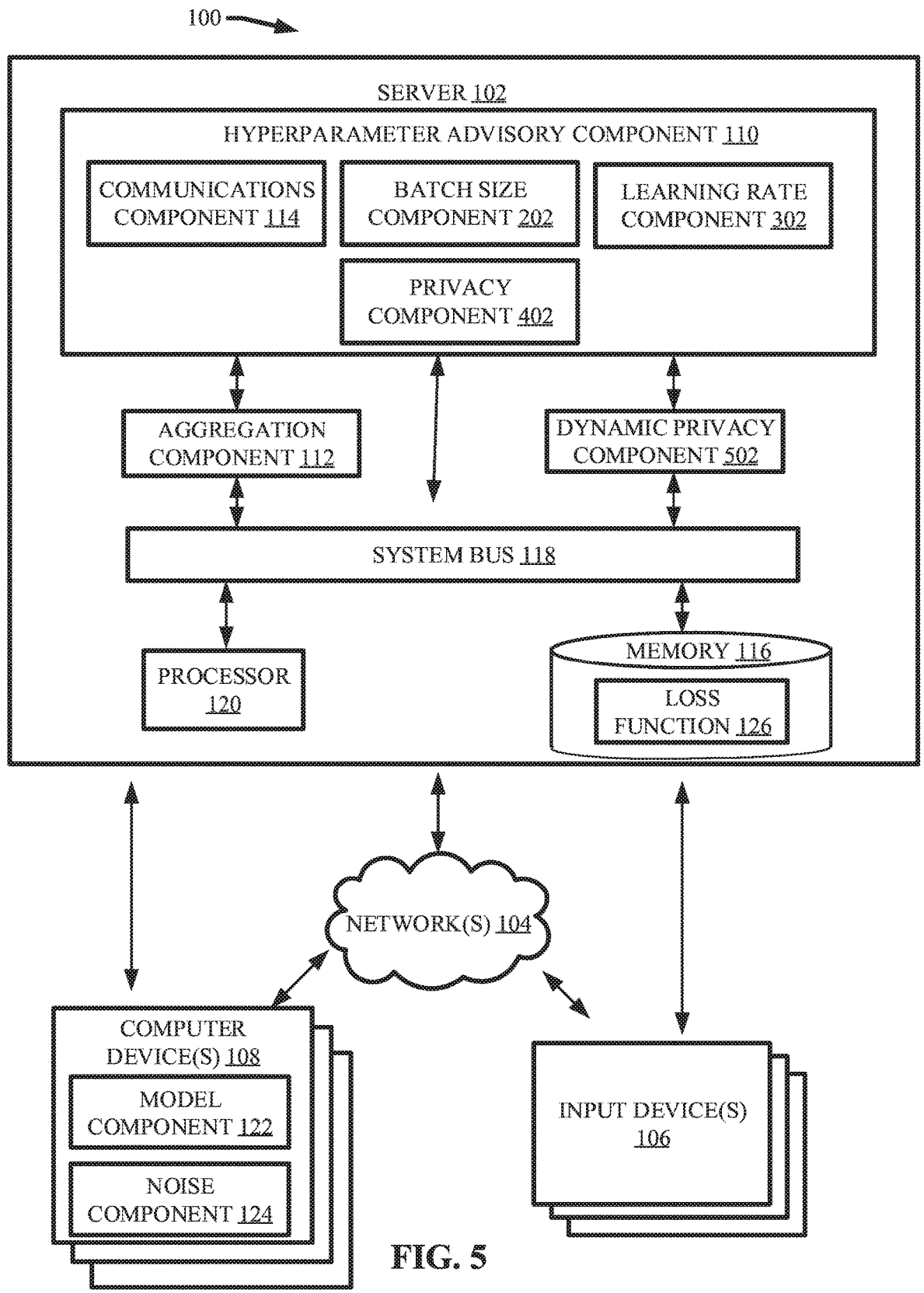
FIG. 5 illustrates a block diagram of an example, non-limiting system that can allocate noise to be added to machine learning model parameters based on a non-uniform noise distribution across the training iterations in accordance with one or more embodiments described herein.

FIG. 5 illustrates a diagram of the example, non-limiting system 100 further comprising dynamic privacy component 502 in accordance with one or more embodiments described herein. Repetitive description of like elements employed in other embodiments described herein is omitted for sake of brevity. In various embodiments, the dynamic privacy component 502 can determine a non-uniform noise distribution scheme that allocate varying amounts of noise across the training iterations to improve model accuracy while achieving differential privacy.

The total privacy budget β can characterize the amount of noise added to the machine learning models after T iterations of training, wherein $\beta = T\epsilon_0$ if a fixed value of the privacy parameter is utilized. In one or more embodiments, the dynamic privacy component 502 can choose a dynamic schedule for the privacy parameters for each training iteration $\epsilon_t$ so long as $$\sum_{t=1}^{T} \epsilon_t \leq \beta.$$

As shown in the loss function 126 (e.g., Equation 32), the additional loss function can be dependent on $$\frac{\eta}{S^2 \epsilon^2},$$

wherein η is decreased in SGD over the course of training for convergence.

The dynamic privacy component 502 can distribute the total privacy budget in a non-uniform manner across the training iterations. For example, the dynamic privacy component 502 can instruct the noise component 124 to utilize a higher value of the privacy parameter e in the initial phase of the training and then utilize a lesser privacy parameter in later training iterations, wherein the dynamic privacy component 502 can determine a decrease in the value of the privacy parameter that is in lock-step with the learning rate by the same factor. For example, wherein the learning rate decreases by a factor K over the training iterations, the dynamic privacy component 502 can define the privacy parameter such that the privacy parameter also decreases by the factor K over the training iterations. Thereby, the dynamic privacy component 502 can direct the addition of less noise in an initial phase of the model training and more added noise towards a later phase of the model training. By allocating a non-uniform noise distribution to the noise components 124, the dynamic privacy component 502 can achieve a higher machine learning model accuracy with the same total privacy budget, as compare to conventional differential privacy processes.

In one or more embodiments, the dynamic privacy component 502 can use the entered learning rate schedule to determine the learning rate for each iteration of the training process. Further, the dynamic privacy component 502 can determine a non-uniform noise distribution scheme that can be executed by the noise components 124 to distribute the privacy budget across the training iterations in accordance with the same ratio as that of the learning rate across the training iterations. For instance, if the learning rate decreases by a factor of K after N training iterations, the dynamic privacy component 502 can determine a non-uniform noise distribution scheme that directs the noise components 124 to utilize privacy parameters that decrease by the factor K at the N training iterations. The noise components 124 can utilize the non-uniform noise distribution scheme to determine the amount of noise to be added to gradients; for example, entailing generating a Gaussian random variable with zero mean and standard deviation proportional to the privacy budget parameter. Then the noise component 124 can add the determined noise to the gradient and share the trained machine learning models with the aggregation component 112.

Figure 6A:
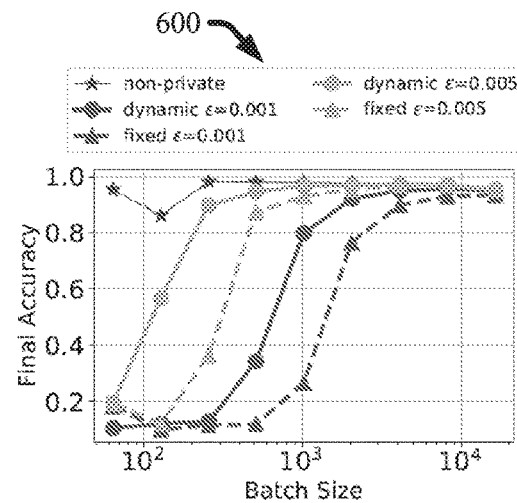
FIG. 6A illustrates a diagram of an example, non-limiting graph that can depict the efficacy of a non-uniform noise distribution across multiple training iterations in training a machine learning model in a differentially private federated learning process in accordance with one or more embodiments described herein.
Figure 6B:
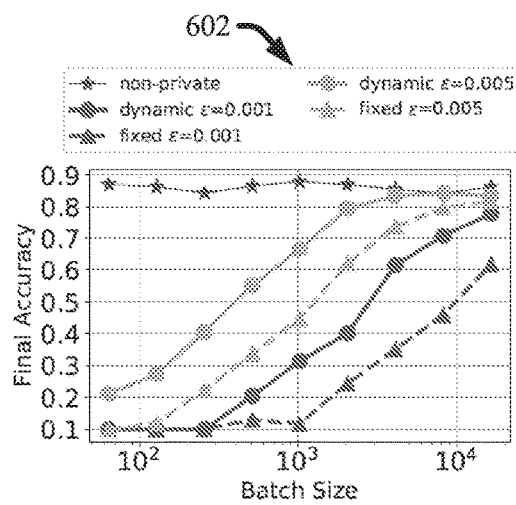
FIG. 6B illustrates a diagram of an example, non-limiting graph that can depict the efficacy of a non-uniform noise distribution across multiple training iterations in training a machine learning model in a differentially private federated learning process in accordance with one or more embodiments described herein.
Figure 6C:
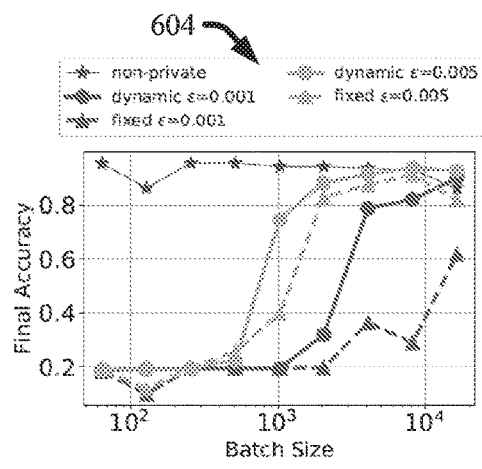
FIG. 6C illustrates a diagram of an example, non-limiting graph that can depict the efficacy of a non-uniform noise distribution across multiple training iterations in training a machine learning model in a differentially private federated learning process in accordance with one or more embodiments described herein.

FIGS. 6A-6C illustrate diagrams of example, non-limiting graphs 600, 602, and/or 604, which can depict the efficacy of implementing one or more non-uniform noise distribution schemes in accordance with one or more embodiments described herein. Repetitive description of like elements employed in other embodiments described herein is omitted for sake of brevity. The experiments conducted to achieve the data depicted in graphs 600, 602, and/or 604 were executed on a cluster of V100 CPUs. The number of computing devices 108 used varied depending on the given batch size. Each computing device 108 was equipped with 2 V100 GPUs, 32 gigabytes (GB) of random-access memory (RAM) and 16 Intel 2.0 giga-Hertz (GHz) central processing unit ("CPU") cores.

Three machine learning models were trained using three different datasets to analyze the results for various values of S, η, ∈. For the MNIST dataset, a 2-layer fully connected neural net with ReLU activation functions was trained. For the Resnet-18 model, the CIFAR-10 dataset was utilized; and for the Resnet-50 model, the SVHN dataset was utilized. Each of the machine learning models were trained for 200 epochs using plain and differential privacy versions of SGD. A learning rate schedule of 0.1 was used for the first 80 epochs, 0.01 for the next 40 epochs, and 0.001 for the remaining 80 epochs. The implementations of differentially private SGD can make use of the open source implementation of SGD included in PyTorch, wherein the source code can be modified to include the appropriate Gaussian noise at each iteration of training.

Graphs 600, 602, and/or 604 can illustrate one or more benefits of dynamically varying the privacy parameter E as described in various embodiments described herein. As described herein, the privacy parameter e was decreased (e.g., as defined by the dynamic privacy component 502) by the same factor as the learning rate over the course of training, keeping the ratio η/∈ constant across training iterations. Graphs 600, 602, and/or 604 show that for a given batch size, an adaptive e schedule (e.g., a non-uniform noise distribution scheme) can result in significantly higher model accuracy as opposed to a fixed e with the same total privacy budget. For example, for the SVHN dataset for a batch size of 8 thousand and a privacy budget of 0.001*T, the accuracy can jump from 38% to 80% with the dynamic privacy schedule as opposed to the fixed privacy schedule.

Since the termination criterion can be a maximum number of iterations, for the fixed privacy schedule the total privacy budget β will depend on the size e of the training dataset N, the batch size used S, and the number of training iterations (e.g., 200 training iterations) in accordance with Equation 33 below.

$$\beta = \frac{N}{S} \cdot 200 \cdot \epsilon \qquad (32)$$

The dynamic privacy schedule can take the total privacy budget β and apportion it such that the privacy loss at each iteration $\epsilon_i$ can follow the desired schedule.

Figure 6D:
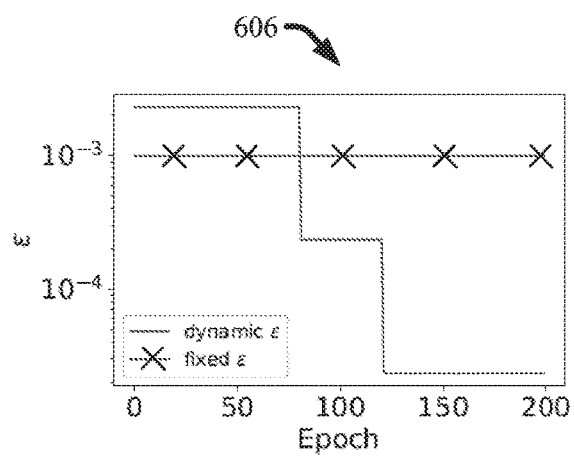
FIG. 6D illustrates a diagram of an example, non-limiting graph that can depict the efficacy of a non-uniform noise distribution across multiple training iterations in training a machine learning model in a differentially private federated learning process in accordance with one or more embodiments described herein.

FIG. 6D illustrates a diagram of an example, non-limiting graph 606 that can demonstrate variation in the privacy parameter as defined in a non-uniform noise distribution scheme (e.g., a dynamic privacy schedule) in accordance with one or more embodiments described herein. Repetitive description of like elements employed in other embodiments described herein is omitted for sake of brevity. Graph 606 depicts the dynamic privacy schedule for CIFAR-10 with a batch size of 1024 data points. As shown in graph 608, the dynamic privacy schedule can comprise a non-uniform distribution of noise, wherein the value of the noise parameter decreases over the training period, as described herein.

Figure 7A:
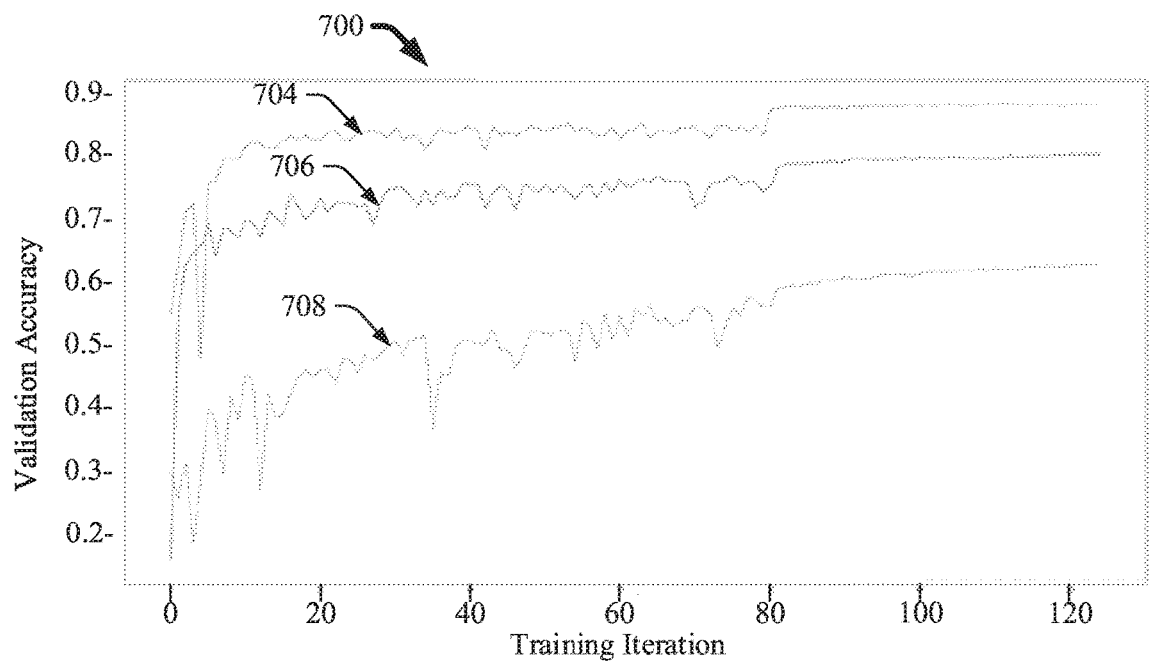
FIG. 7A illustrates a diagram of an example, non-limiting graph that can depict the efficacy of a non-uniform noise distribution across multiple training iterations in training a machine learning model at a first batch size in a differentially private federated learning process in accordance with one or more embodiments described herein.
Figure 7B:
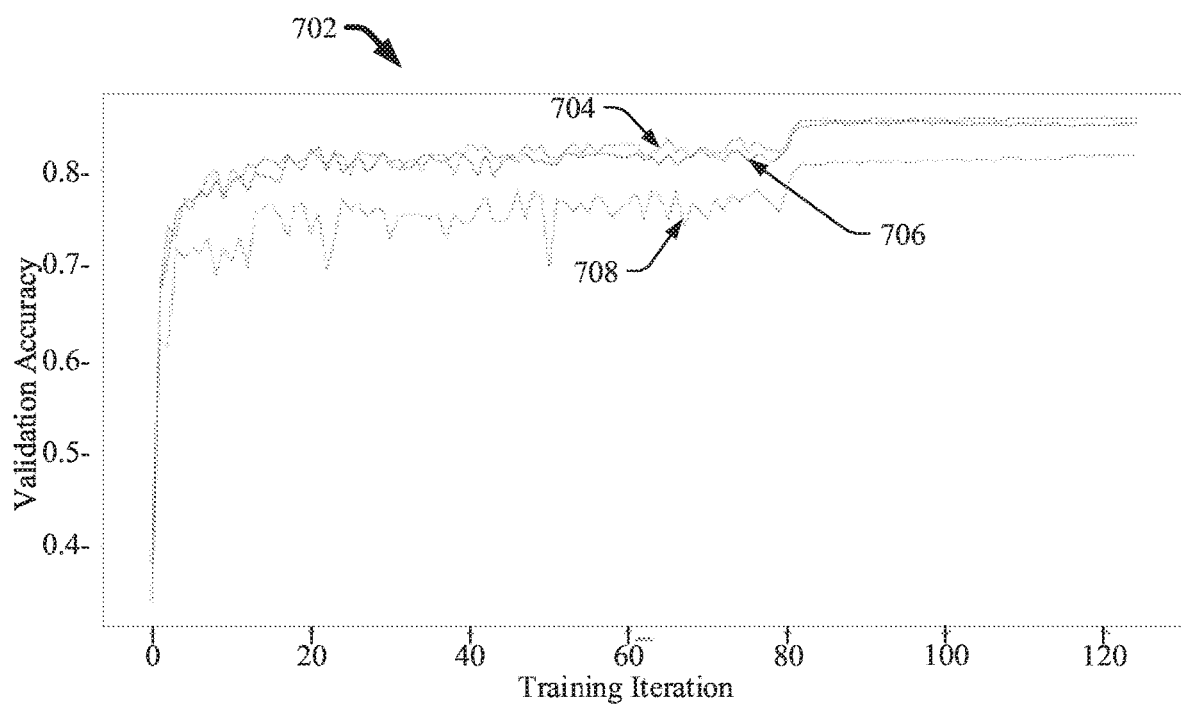
FIG. 7B illustrates a diagram of an example, non-limiting graph that can depict the efficacy of a non-uniform noise distribution across multiple training iterations in training a machine learning model at a second batch size in a differentially private federated learning process in accordance with one or more embodiments described herein.

FIGS. 7A-7B illustrate diagrams of example, non-limiting graphs 700 and 702 that can demonstrate the effect of varying the privacy parameter and/or batch size on the accuracy of the machine learning models in accordance with one or more embodiments described herein. Repetitive description of like elements employed in other embodiments described herein is omitted for sake of brevity. Line 704 corresponds to the accuracy of the machine learning model, wherein differential privacy is not incorporated. Line 706 corresponds to the accuracy of the machine learning model trained using a dynamic privacy schedule (e.g., a non-uniform distribution of noise across the training iterations). Line 708 corresponds to the accuracy of the machine learning model trained using a fixed privacy schedule (e.g., a uniform, such as constant, distribution of noise across the training iterations). Further, graph 700 depicts the machine learning model trained using a 1,024 batch size; while graph 702 depicts the machine learning model trained using a 4,096 batch size. As shown in graphs 700 and/or 702, the dynamic privacy schedule, as described herein, can achieve a higher level of accuracy than the fixed privacy schedule.

Also shown in graphs 700 and/or 702, increasing the batch size used for training the machine learning model can further increase the model accuracy.

FIG. 8 illustrates a flow diagram of an example, non-limiting computer-implemented method 800 that can facilitate determining one or more hyperparameters for a differentially private federated learning process in accordance with one or more embodiments described herein. Repetitive description of like elements employed in other embodiments described herein is omitted for sake of brevity.

At 802, the computer-implemented method 800 can comprise receiving (e.g., via communications component 114, input devices 106, and/or network 104), by a system 100 operatively coupled to a processor 120, hyperparameters regarding a differentially private federated learning process, wherein the hyperparameters can be selected from a group consisting of a privacy budget, a learning rate, and/or a batch size. As described herein, the federated learning process can incorporate one or more SGD techniques into one or more differential privacy processes to be executed by a plurality of computer devices 108 to train a machine learning model while achieving a desired level of data privacy. The privacy budget can delineate a total amount of noise that can be added (e.g., via noise component 124) to subsets of the machine learning models to facilitate the differential privacy process. In one or more embodiments, the privacy budget can define one or more privacy parameters, which can allocate the amount of noise to be added after each training iteration. The learning rate can be comprised within one or more learning rate schedules and can be used (e.g., via model component 122) to train subsets of the machine learning model across multiple training iterations. The batch size can delineate the amount of data points that can be sampled (e.g., via model component 122) across the training iterations to train the subsets of the machine learning model.

At 804, the computer-implemented method 800 can comprise determining (e.g., via hyperparameter advisory component 110), by the system 100, a first hyperparameter for the machine learning model of the differentially private federated learning process, wherein the first hyperparameter can be determined given a plurality of second hyperparameters, and wherein the first hyperparameter and the plurality of second hyperparameters can be selected from the group of 802. For example, the determining at 804 can be based on the analytical relationship defined by the loss function 126 (e.g., exemplified by Equation 32) described herein. In various embodiments, the plurality of second hyperparameters can comprise hyperparameters received at 802.

In one or more embodiments, the first hyperparameter can be the batch size and the plurality of second hyperparameters can be the privacy budget and the learning rate. Thereby, the determining at 804 can comprise determining (e.g., via batch size component 202) the batch size to be used in training the machine learning model, wherein the privacy budget and the learning rate are received at 802. As described in various embodiments herein, the batch size can be determined based on the loss function 126. Further, the determining at 804 can comprise determining the batch size that can maximize accuracy of the machine learning model given the received privacy budget and/or learning rate.

In one or more embodiments, the first hyperparameter can be the learning rate and the plurality of second hyperparameters can be the privacy budget and the batch size. Thereby, the determining at 804 can comprise determining (e.g., via learning rate component 302) the learning rate to be used in training the machine learning model, wherein the privacy budget and the batch size are received at 802. As described in various embodiments herein, the learning rate can be determined based on the loss function 126. Further, the determining at 804 can comprise determining the learning rate that can maximize accuracy of the machine learning model given the received privacy budget and/or batch size.

In one or more embodiments, the first hyperparameter can be the privacy budget and the plurality of second hyperparameters can be the learning rate and the batch size. Thereby, the determining at 804 can comprise determining (e.g., via privacy component 402) the privacy budget (e.g., comprising one or more privacy parameters) to be used in adding noise to the machine learning model, wherein the learning rate and the batch size are received at 802. As described in various embodiments herein, the privacy budget (e.g., the one or more privacy parameters) can be determined based on the loss function 126. Further, the determining at 804 can comprise determining the privacy budget (e.g., privacy parameters) that can maximize accuracy of the machine learning model given the received learning rate and/or batch size.

FIG. 9 illustrates a diagram of an example, non-limiting computer-implemented method 900 that can facilitate allocating a non-uniform distribution of noise based on a dynamic privacy scheme for a differentially private federated learning process in accordance with one or more embodiments described herein. Repetitive description of like elements employed in other embodiments described herein is omitted for sake of brevity.

At 902, the computer-implemented method 900 can comprise receiving (e.g., via communications component 114, input devices 106, and/or network 104), by a system 100 operatively coupled to a processor 120, hyperparameters regarding a differentially private federated learning process, wherein the hyperparameters can be selected from a group consisting of a privacy budget, a learning rate, and/or a batch size. As described herein, the federated learning process can incorporate one or more SGD techniques into one or more differential privacy processes to be executed by a plurality of computer devices 108 to train a machine learning model while achieving a desired level of data privacy. The privacy budget can delineate a total amount of noise that can be added (e.g., via noise component 124) to subsets of the machine learning models to facilitate the differential privacy process. In one or more embodiments, the privacy budget can define one or more privacy parameters, which can allocate the amount of noise to be added after each training iteration. The learning rate can be comprised within one or more learning rate schedules and can be used (e.g., via model component 122) to train subsets of the machine learning model across multiple training iterations. The batch size can delineate the amount of data points that can be sampled (e.g., via model component 122) across the training iterations to train the subsets of the machine learning model.

At 904, the computer-implemented method 900 can comprise allocating (e.g., via dynamic privacy component 502), by the system 100, a non-uniform distribution of noise across a plurality of training iterations for a model of a differentially private federated learning process. For example, the allocating at 904 can comprise allocating less noise to be added to the model as the training progresses. In one or more embodiments, the allocating at 904 can comprise determining (e.g., via the dynamic privacy component 502), a learning rate ratio as a function of a first learning rate of a first training iteration and a second learning rate of a second training iteration, and distributing a privacy budget across the plurality of training iterations based on the learning rate ratio. For instance, as the learning rate decreases by the learning rate ratio, the allocating can comprise decreasing the amount of noise distributed across the training iterations by the learning rate ratio.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
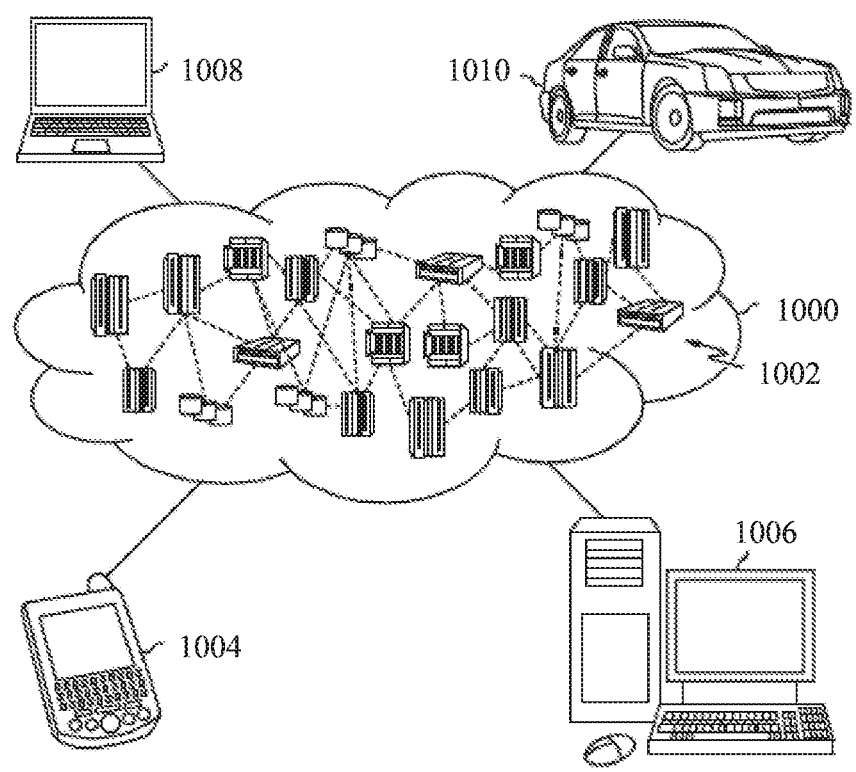
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
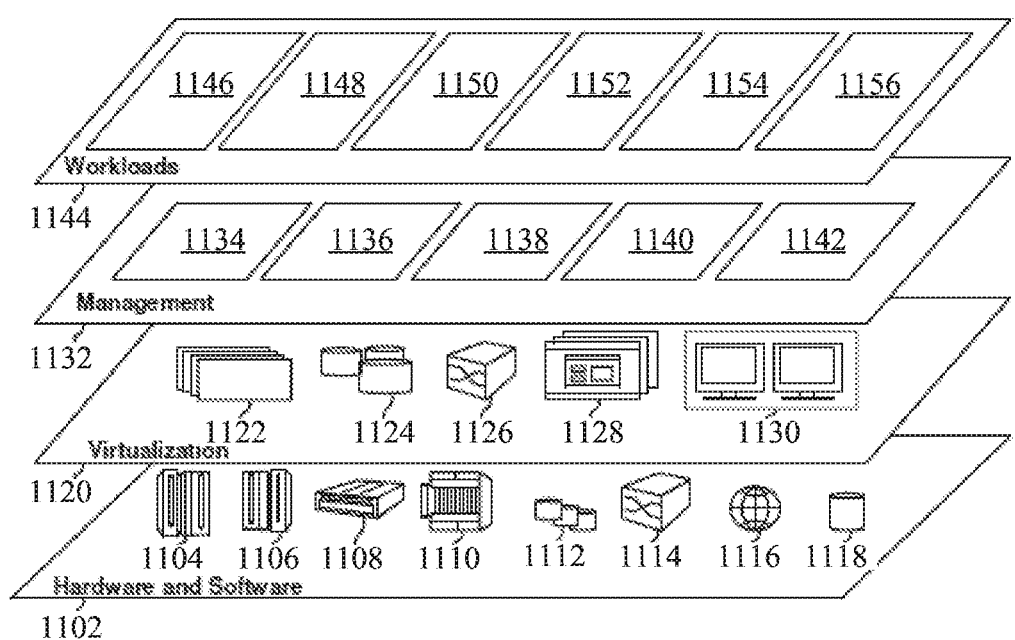
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and differentially private federated learning processing 1156. Various embodiments of the present invention can utilize the cloud computing environment described with reference to FIGS. 10 and 11 to execute one or more differentially private federated learning process in accordance with various embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
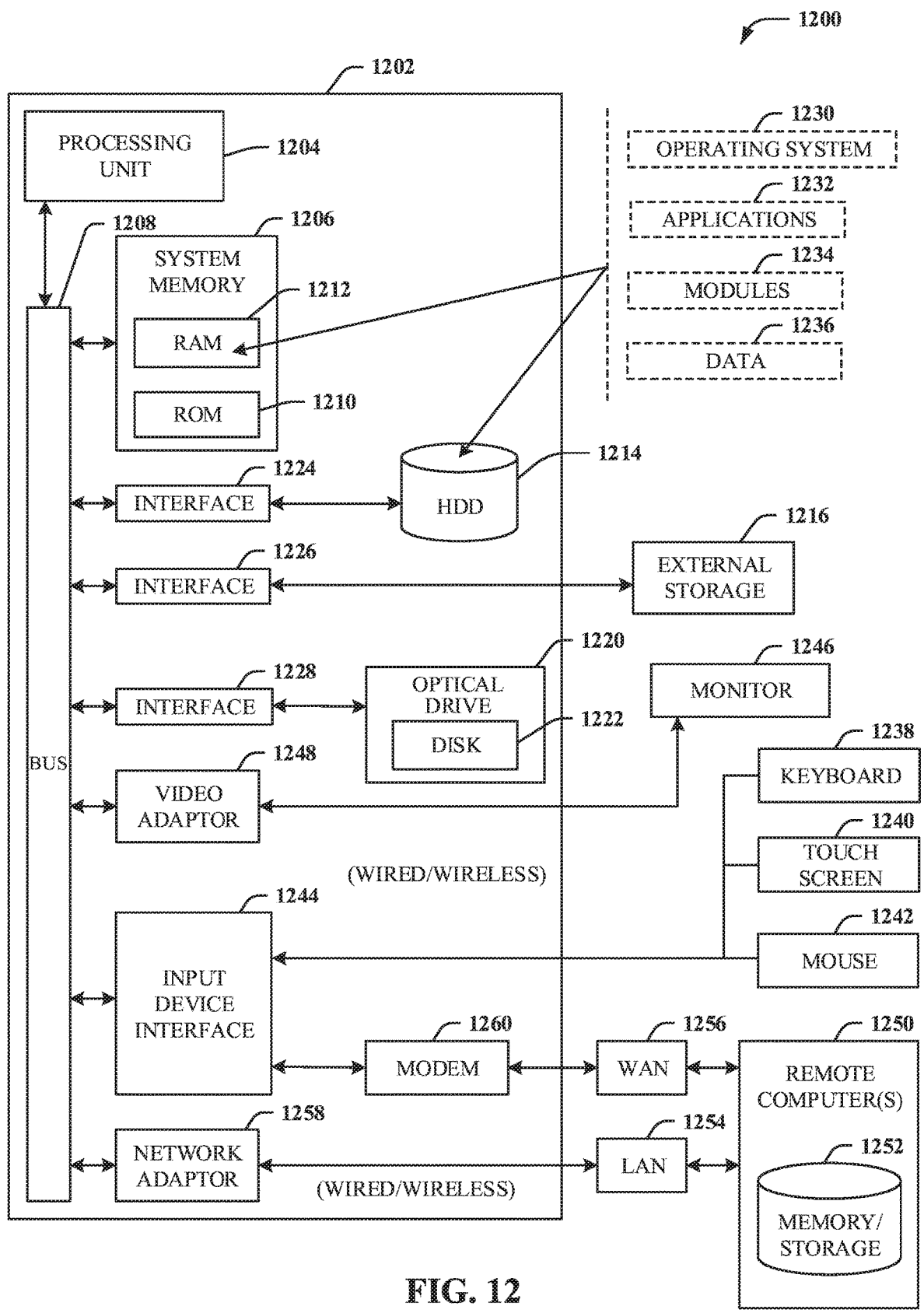
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as we as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. A or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("M") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ('Wi-F') and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor, operably coupled to the memory, and that executes the computer executable components stored in the memory, wherein the computer executable components comprise:
a hyperparameter advisory component that iteratively trains an overall machine learning model of a differentially private federated learning process, wherein the training comprises, at each iteration:
determining respective values of a hyperparameter for machine learning models distributed on computing devices based on respective privacy budgets, respective learning rate schedules, and respective batch sizes associated with the machine learning models, wherein the respective values of the hyperparameter indicate respective amounts of noise to introduce to respective derivatives of the machine learning models from training to achieve respective defined amounts of privacy of respective training data employed for the training of the machine learning models;
transmitting the respective values of the hyperparameter to the computing devices to train the machine learning models and introduce the respective amounts of noise to the respective derivatives of the machine learning models;
receiving the respective derivatives of the machine learning models from the computing devices; and
aggregating the respective derivatives of the machine learning models to update the overall machine learning model, wherein the respective derivatives comprise at least model weights.

2. The system of claim 1, wherein the respective privacy budgets associated with the machine learning models define respective total amounts of noise that can be added during the training of the associated machine learning models, wherein the respective learning rate schedules associated with the machine learning models define respective learning rates used at the iterations during the training of the associated machine learning models, and wherein the respective batch sizes associated with the machine learning models define respective amounts of data points used at the iterations during the training of the associated machine learning models.

3. The system of claim 1, wherein the hyperparameter advisory component further determines respective batch size computations associated with the machine learning models based on the respective privacy budgets and the respective learning rate schedules associated with the machine learning models, wherein the respective batch size computations comprise at least one of the respective batch sizes, respective first factors by which the respective batch sizes change in relation to respective changes in the respective learning rate schedules, and respective second factors by which the respective batch sizes change in relation to respective changes in the respective privacy budgets.

4. The system of claim 1, wherein the hyperparameter advisory component further determines respective learning rate computations associated with the machine learning models based on the respective privacy budgets and the respective batch sizes associated with the machine learning models, wherein the respective learning rate computations comprise at least one of the respective learning rate schedules, respective first factors by which the respective learning rate schedules change in relation to respective changes in the respective batch sizes, and respective second factors by which the respective learning rate schedules change in relation to respective changes in the respective privacy budgets.

5. The system of claim 1, wherein the hyperparameter advisory component further determines respective privacy computations associated with the machine learning models based on the respective batch sizes and the learning rate schedules associated with the machine learning models, wherein the respective privacy computations at least one of the respective privacy budgets, respective first factors by which the respective privacy budgets change in relation to respective changes in the respective learning rate schedules, and respective second factors by which the respective privacy budgets change in relation to respective changes in the respective batch sizes.

6. The system of claim 1, wherein the respective amounts of noise increase as the respective batch sizes increase.

7. The system of claim 1, wherein the respective amounts of noise increase as respective learning rates defined in the respective learning rate schedules decrease.

8. A system, comprising:
a memory that stores computer executable components; and
a processor, operably coupled to the memory, and that executes the computer executable components stored in the memory, wherein the computer executable components comprise:
a model component that iteratively trains a machine learning model of a differentially private federated learning process, wherein the training comprises, at each iteration:
receiving, from a server device, a hyperparameter that was determined based on a privacy budget, a learning rate schedule, and a batch size associated with the machine learning model, wherein the value of the hyperparameter indicates an amount of noise to introduce to derivatives of the machine learning model from training to achieve a defined amount of privacy of training data employed for the training of the machine learning model, wherein the derivatives comprise at least model weights;
training the machine learning model using the training data;
introducing the amount of noise to the derivatives of the machine learning models from the training; and
sending the derivatives to the server device for training an overall machine learning model of the differentially private federated learning process.

9. The system of claim 8, wherein the privacy budget associated with the machine learning model defines a total amount of noise that can be added during the training of the machine learning model, wherein the learning rate schedule associated with the machine learning model defines learning rates used at the iterations during the training of the machine learning model, and wherein the batch size associated with the machine learning model defines amounts of data points used at the iterations during the training of the machine learning model.

10. The system of claim 8, wherein the amount of noise increases as the batch size increases.

11. The system of claim 8, wherein the amount of noise increases as a learning rate defined in the learning rate schedule decreases.

12. A computer-implemented method, comprising:
iteratively training, by a system operatively coupled to a processor, an overall machine learning model of a differentially private federated learning process, wherein the training comprises, at each iteration:
   determining respective values of a hyperparameter for machine learning models distributed on computing devices respective privacy budgets, respective learning rate schedules, and respective batch sizes associated with the machine learning models, wherein the respective values of the hyperparameter indicate respective amounts of noise to introduce to respective derivatives of the machine learning models from training to achieve respective defined amounts of privacy of respective training data employed for the training of the machine learning models;
   transmitting the respective values of the hyperparameter to the computing devices to train the machine learning models and introduce the respective amounts of noise to the respective derivatives of the machine learning models;
   receiving the respective derivatives of the machine learning models from the computing devices; and
   aggregating the respective derivatives of the machine learning models to update the overall machine learning model, wherein the respective derivatives comprise at least model weights.

13. The computer-implemented method of claim 12, wherein the respective privacy budgets associated with the machine learning models define respective total amounts of noise that can be added during the training of the associated machine learning models, wherein the respective learning rate schedules associated with the machine learning models define respective learning rates used at the iterations during the training of the associated machine learning models, and wherein the respective batch sizes associated with the machine learning models define respective amounts of data points used at the iterations during the training of the associated machine learning models.

14. The computer-implemented method of claim 12, wherein the respective amounts of noise increase as the respective batch sizes increase.

15. The computer-implemented method of claim 12, wherein the respective amounts of noise increase as respective learning rates defined in the respective learning rate schedules decrease.

16. A computer-implemented method, comprising:
iteratively training, by a system operatively coupled to a processor, a machine learning model of a differentially private federated learning process, wherein the training comprises, at each iteration:
   receiving, from a server device, a hyperparameter that was determined based on a privacy budget, a learning rate schedule, and a batch size associated with the machine learning models wherein the value of the hyperparameter indicates an amount of noise to introduce to derivatives of the machine learning models from training to achieve a defined amount of privacy of training data employed for the training of the machine learning model, wherein the derivatives comprise at least model weights;
   training the machine learning model using the training data;
   introducing the amount of noise to the derivatives of the machine learning models from the training; and
   sending the derivatives to the server device for training an overall machine learning model of the differentially private federated learning process.

17. The computer-implemented method of claim 16, wherein privacy budget associated with the machine learning model defines a total amount of noise that can be added during the training of the machine learning model, wherein the learning rate schedule associated with the machine learning model defines learning rates used at the iterations during the training of the machine learning model, and wherein the batch size associated with the machine learning model defines amounts of data points used at the iterations during the training of the machine learning model.

18. The computer-implemented method of claim 16, wherein the amount of noise increases as the batch size increases.

19. The computer-implemented method of claim 16, wherein the amount of noise increases as a learning rate defined in the learning rate schedule decreases.

20. A computer program product for recommending hyperparameters for a differentially private federated learning process, the computer program product comprising a computer readable storage medium having program instructions embodied therewith, the program instructions executable by a processor to cause the processor to:
   iteratively train, by the processor, an overall machine learning model of a differentially private federated learning process, wherein the training comprises, at each iteration:
   determine, by the processor, respective values of a hyperparameter for machine learning models distributed on computing devices based on respective privacy budgets, respective learning rate schedules, and respective batch sizes associated with the machine learning models, wherein the respective values of the hyperparameter indicate respective amounts of noise to introduce to respective derivatives of the machine learning models from training to achieve respective defined amounts of privacy of respective training data employed for the training of the machine learning models;
   transmit, by the processor, the respective values of the hyperparameter to the computing devices to train the machine learning models and introduce the respective amounts of noise to the respective derivatives of the machine learning models;
   receive, by the processor, the respective derivatives of the machine learning models from the computing devices; and
   aggregate, by the processor, the respective derivatives of the machine learning models to update the overall machine learning model, wherein the respective derivatives comprise at least model weights.

21. The computer program product of claim 20, wherein respective privacy budgets associated with the machine learning models define respective total amounts of noise that can be added during the training of the associated machine learning models, wherein the respective learning rate schedules associated with the machine learning models define respective learning rates used at the iterations during the training of the associated machine learning models, and wherein the respective batch sizes associated with the machine learning models define respective amounts of data points used at the iterations during the training of the associated machine learning models.

22. The computer program product of claim 20, wherein the program instructions further cause the processor to:
   determine, by the processor, respective batch size computations associated with the machine learning models based on the respective privacy budgets and the respective learning rate schedules associated with the machine learning models, wherein the respective batch size computations comprise at least one of the respective batch sizes, respective first factors by which the respective batch sizes change in relation to respective changes in the respective learning rate schedules, and respective second factors by which the respective batch sizes change in relation to respective changes in the respective privacy budgets.

23. The computer program product of claim 20, wherein the program instructions further cause the processor to:
   determine, by the processor, respective learning rate computations associated with the machine learning models based on the respective privacy budgets and the respective batch sizes associated with the machine learning models, wherein the respective learning rate computations comprise at least one of the respective learning rate schedules, respective first factors by which the respective learning rate schedules change in relation to respective changes in the respective batch sizes, and respective second factors by which the respective learning rate schedules change in relation to respective changes in the respective privacy budgets.

24. The computer program product of claim 20, wherein the program instructions further cause the processor to:
   determine, by the processor, respective privacy computations associated with the machine learning models based on the respective batch sizes and the learning rate schedules associated with the machine learning models, wherein the respective privacy computations at least one of the respective privacy budgets, respective first factors by which the respective privacy budgets change in relation to respective changes in the respective learning rate schedules, and respective second factors by which the respective privacy budgets change in relation to respective changes in the respective batch sizes.

25. The computer program product of claim 20, wherein at least one of:
   the respective amounts of noise increase as the respective batch sizes increase, or
   the respective amounts of noise increase as respective learning rates defined in the respective learning rate schedules decrease.

* * * * *